US008955461B2

(12) United States Patent
Lloyd

(10) Patent No.: US 8,955,461 B2
(45) Date of Patent: Feb. 17, 2015

(54) ANIMAL TRAINING APPARATUS

(76) Inventor: Susan Jane Lloyd, Anstead (AU)

(*) Notice: Subject to any disclaimer, the term of this patent is extended or adjusted under 35 U.S.C. 154(b) by 21 days.

(21) Appl. No.: 12/878,150

(22) Filed: Sep. 9, 2010

(65) Prior Publication Data

US 2011/0061349 A1    Mar. 17, 2011

(30) Foreign Application Priority Data

Sep. 11, 2009  (AU) .............................. 2009904352

(51) Int. Cl.
*A01K 15/00* (2006.01)
*B68B 1/00* (2006.01)
*A01K 15/02* (2006.01)

(52) U.S. Cl.
CPC .............. *A01K 15/02* (2013.01); *A01K 15/021* (2013.01)
USPC .............................................. 119/719; 54/71

(58) Field of Classification Search
USPC ........ 54/7, 38.1, 44.1, 71; 119/712, 719, 725, 119/729, 760, 761, 766, 814, 815, 821, 833
See application file for complete search history.

(56) References Cited

U.S. PATENT DOCUMENTS

| | | | |
|---|---|---|---|
| 3,837,142 A | 9/1974 | Hill | |
| 4,040,422 A | 8/1977 | Kuhn | |
| 4,193,517 A * | 3/1980 | Fetty et al. | 222/78 |
| 4,280,316 A | 7/1981 | Taylor | |
| 4,535,724 A | 8/1985 | David | |
| 5,557,905 A | 9/1996 | Harding | |
| 5,566,645 A * | 10/1996 | Cole | 119/712 |
| 5,809,939 A * | 9/1998 | Robart et al. | 119/712 |
| 6,651,592 B2 * | 11/2003 | Maddox et al. | 119/720 |
| 6,694,920 B1 * | 2/2004 | Noe | 119/712 |
| 6,820,571 B2 * | 11/2004 | Cory | 119/712 |
| 6,953,007 B1 | 10/2005 | Cummings | |
| 6,983,866 B2 * | 1/2006 | Smart et al. | 222/192 |
| 7,073,688 B2 | 7/2006 | Choi et al. | |
| 7,497,186 B2 | 3/2009 | Dorton et al. | |
| 2005/0183674 A1 * | 8/2005 | Zutis et al. | 119/719 |
| 2006/0219187 A1 * | 10/2006 | Krishnamurthy | 119/719 |
| 2006/0249530 A1 * | 11/2006 | Ho | 222/39 |
| 2007/0074668 A1 | 4/2007 | Zutis et al. | |
| 2008/0000927 A1 * | 1/2008 | Butler | 222/78 |

FOREIGN PATENT DOCUMENTS

| | | | |
|---|---|---|---|
| DE | 19500520 | * | 7/1996 |
| WO | 95/20871 | | 8/1995 |

OTHER PUBLICATIONS

Translation of DE19500520.*
Amanda K. Warren-Smith; "Equestrian Coaches' Understanding and Application of Learning Theory in Horse Training"; Anthrozoos vol. 21, Issue 2, pp. 153-162.
Frank O. Odberg; "The development of equestrianism from the baroque period to the present day and its consequences for the welfare of horses"; Equine vet. J., Suppl. 28 (1999) 26-30.

* cited by examiner

*Primary Examiner* — David Parsley
*Assistant Examiner* — Thien Thanh Pham
(74) *Attorney, Agent, or Firm* — Morris, Manning & Martin, LLP; Christopher W. Raimund

(57) ABSTRACT

A trigger arrangement for an animal training apparatus, the trigger arrangement including a fluid pump having a pump actuator, the pump including an inlet and an outlet and a sound emitter configured to be actuated by the pump actuator, wherein actuation of the pump pumps fluid from the inlet to the outlet accompanied by a simultaneous emission of sound from the sound emitter.

25 Claims, 15 Drawing Sheets

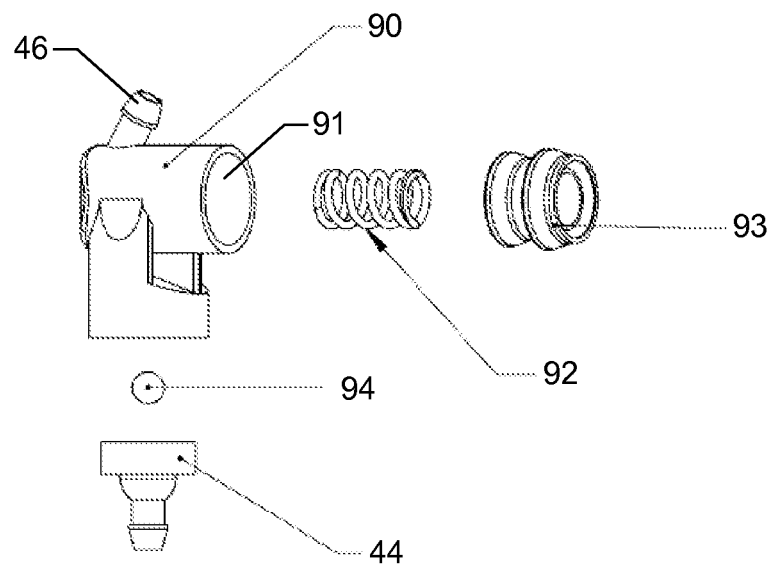
Figure 12.
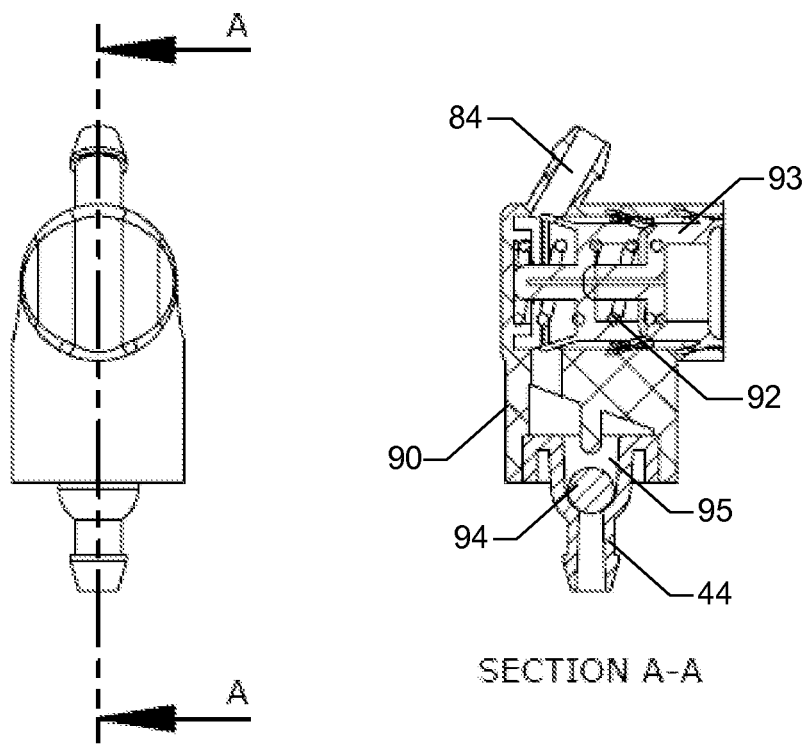
Figure 13. Figure 14.

ANIMAL TRAINING APPARATUS

BACKGROUND OF THE INVENTION

This invention relates to a trigger arrangement for an animal training apparatus, a reservoir assembly for an animal training apparatus, and animal training apparatus.

DESCRIPTION OF THE PRIOR ART

Reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Historically horses have been trained throughout history to the current day using traditional training methods. According to several published reports in Europe, [Professor Frank Ödberg, Dr Marie-France Bouissou, 1999] over 60% of horses sent to abattoirs are killed at a young age because of behavioural problems. The horse is a mirror of the trainer's art. Horses cannot be "good" or "naughty". These are human concepts. Horses can only behave how they have been trained. Horses are either well trained or badly trained. These startling figures of wastage in the horse industry bring into doubt the efficiency of the traditional training methods based on aversion and coercion.

Poor training seriously affects the welfare of the horse [N Waran, The Welfare of Horses, 2002]. The stress placed on horses trained with traditional training methods degrades their health, soundness, mental wellbeing, performance and behaviour. Poorly trained horses commonly experience abuse and neglect, sometimes for many years, before they are sent to an abattoir to be killed.

Rider safety is another serious problem caused by poor horse training. Horses can gallop at 40 kmph and they can weigh up to 600 kilos. A rider's head can be 2 meters above the ground when riding. Published studies show that equestrian pursuits are more dangerous than motorsports: horse riders are 20 times more likely to have an accident than motorbike riders [Firth J L, Equestrian Injuries, 1994].

To illustrate the principles of how a horse learns we can think of an example of a new born foal and her first drink of milk from her mother. Once standing, the foal is nudged gently by her mother's nose [McDonnell S, Horse Behavior The Equid Ethogram, 2003]. When she moves away from the pressure the pressure ceases. The foal associates moving away from the pressure with the instant removal of that pressure (negative reinforcement). When the foal finds the milk and latches on to her mother's teat she sucks and drinks delicious, sweet, warm milk. She associates the action of finding the teat with the reward of the milk (positive reinforcement) [Kiley-Worthington M, Horse Watch, 2005]. She will drink milk from her mother when she is hungry or thirsty but also when she is distressed and wants comfort. This will strengthen her relationship with her mother, provider of safety, comfort and guidance. When she is afraid she will stand next to her mother, when her mother goes somewhere she will willingly follow.

Throughout the history of animal training, most animal communication techniques have been based on negative reinforcement. Training with negative reinforcement requires the horse to associate the removal of a unpleasant stimulus with a given behaviour [McLean A and M, Academic Horse Training, 2008]. To be effective the unpleasant stimulus must be removed immediately following the desired behaviour. Negative does not mean bad—it refers to the removal, the taking away, of the pressure. Training with negative reinforcement by an expert rider applying the lightest of signals from the legs, weight or hands, may be good training. The horse finds the landing of a fly on his body uncomfortable and good horse trainers work with this degree of pressure.

However, the majority of riders and trainers are not expert. Negative reinforcement is difficult to do humanely and ethically. The application of pressure on the horse is stressful to the horse to some degree. Very few riders and trainers understand how horses learn [Warren-Smith A, McGreavy P, Equestrian Coaches' Understanding and Application of Learning Theory in Horse Training, 2008] and few can sit in balance on a horse at all paces and apply clear, unambiguous signals.

The following are the tools available to riders and trainers using negative reinforcement and their potential degrees of use: the weight of rider pushing, bouncing, banging; legs pushing, squeezing, gripping, niggling; heels touching, banging, kicking; spurs touching, poking, kicking, bruising; whips touching, tapping, hitting, beating, cutting; voice commanding, threatening, shouting; bit(s) pressing, pulling, bruising, cutting; noseband forcing mouth shut, pressing; nose chain pressing, bruising; tongue strap tying down tongue; bridle with lever action tightening on poll; curb chain, lever action tightening on chin; ropes flicking, hitting, beating; martingales, draw reins and running reins to force head down.

The use of these forceful and potentially abusive tools on the horse causes various degrees of stress leading to tension and fear. The horse is a flight animal and fear in them will evoke the flight response. Signs of fear are raised body carriage, tail raised, snorting, running away (flight response). If the horse is stressed/fearful/adrenalised in training and the flight response is prevented, then the following signs may be seen: higher respiration, higher heart rate, stiff, quick steps, ears back or half back or sideways, tense face, long upper lip, jaw clenched, teeth grinding, tongue withdrawn, tongue lolling, open mouth, oinking sheath, tail swishing, jerky movements, eyes round and whites showing, sad eyes, calling out to other horses, voiding the bowels, cessation of normal responses to stimuli.

The horse perceives the source of all these pressures to be coming from the rider and this causes them to be defensive and fearful of his rider instead of looking to the rider for guidance and safety. Defensive behaviour can escalate from tension and stiffness causing the horse to pull on the reins, kick out, buck, run away, shy, rear, open the mouth, refusal to go forward.

If the horse feels any pain or fear, some degree of tension will result, which will impede ability to learn. Horses can't learn if they are tense or frightened. The presence of fear/stress occupies the brain to such a degree that normal learning processes cannot happen. Instead the horse is in "flight response" and, highly adrenalized, the horse tries to come to a quick solution which, if it works (release of pressure), is very difficult to retrain. No animal or person can engage the brain to explore possible outcomes and learn the correct one while stressed or frightened therefore calmness is a prerequisite of training.

Positive reinforcement is the addition of a pleasant stimulus to the horse immediately following the desired behaviour. Examples are a food reward, a scratch on the withers just in front of the saddle, a walk on a long rein. These stimuli are primary reinforcers. The reinforcer needs to be given to the horse immediately following the desired behaviour to enable them to make the correct association. Positive reinforcement facilitates learning by motivating the horse to perform the desired behaviour with pleasant reward, without fear of aversive pressures decreasing their ability to learn. This allows training with lighter stimuli and a calmer horse with better results.

Published research studies have shown that horses trained with positive reinforcement learn significantly faster than horses using negative reinforcement [Cottongim, S T Positive Reinforcement in Horses, Georgia State University, 1977]. Furthermore a horse trained with positive reinforcement willingly offers new behaviours and is more motivated to try to find the required behaviour. During the acquisition phase of new learning the reward should be given every time the correct response is given [Godfrey J F, How Horses Learn, 1979]. Once a response is learnt the reinforcers can be reduced to intermittent frequency and then faded away with rewards then being used for another subject for new learning. The trainer does not need to keep on repeating exercises over and over again. Attentive, happy horses learn quickly and responses learnt with positive reinforcement are never forgotten.

Horses trained with positive reinforcement and with affiliative training without pressure from their trainers will choose to stand next to the trainer when they are afraid and they will, from choice, follow the trainer wherever she goes [Chatterton J, The Ten Commandments, 2000]. Horses trained under saddle using positive reinforcement follow the guidance of the rider willingly with relaxation. For less than perfect riders and trainers there is more likelihood of success of a partnership with a horse trained with positive reinforcement because of the lack of stress and fear, the horse preferring to be with the trainer and not trying to get away, and increased motivation giving more opportunity for attention and learning effort.

Horses trained calmly and correctly show the following signs: low heart rate, low respiration, relaxed, big, soft eyes, mobile ears, soft relaxed face, relaxed mouth and nostrils, rhythm in movement, harmonious, soft, fluid movement, gently swinging tail, snorting, breathing relaxed, longitudinal flexion, swinging back, quiet mouth, relaxed tongue, receptive to communication with rider/trainer, responsive to trainer/rider, motivated.

Positive reinforcement needs to be delivered immediately following the required response. The trainer on the ground can reward the horse effectively with a hand held treat. The problem experienced by all but expert trainers is that the horse can see and hear the food reward coming from a pocket, a bag or the hand of the trainer. This encourages the horse to search for visual cues of the trainer's posture or hand movements in the hope of further reward. This can lead to lack of attention to the trainer and unrequired investigative behaviour by the horse as he may approach the trainer and begin to search for food. This seriously detracts from the advantages of the positive reinforcement to the extent that many trainers and riders will not use any food rewards.

Skillful riders through the ages know the effectiveness of positive reinforcement [Podhajsky A, The Complete Training of the Horse, 1967; Kyrklund K, Dressage with Kyra 1998; Klimke I & R, Basic Training of the Young Horse 2006]. Horses love food and their motivation and enthusiasm is greatly enhanced when using edible rewards. The problem is that once mounted the rider can give edible rewards only when the horse is at a standstill. The rider must cease the exercise and halt and then bend down and offer a treat and the horse bends their neck around to eat it. This means that only the halt can be rewarded in this way because everything else happened further in the past and the association with the required action will be lost to the horse. The horse may then anticipate reward at the same place and try to slow and halt or turn their head but he is unlikely to understand the association with the required behaviour. The timing problem can be partly solved by bridging with a secondary reinforcer for example saying "good boy" at the point of performance of the required behaviour but the trainer needs to be very consistent keep saying good boy until at halt to give the reward. Problems will be encountered when the horse anticipates halt when he feels he has done the right thing.

Scratching the withers just in front of the saddle is enjoyed by the horse but will be an impediment to mounted work because the rider has to change hand position and interrupt the delicate communication of the rein and weight distribution which may confuse the horse. The use of the voice to say "good boy" and the use of a walk rest on a long rein are both effective but mostly as a relief from the preceding exercise: a celebration of its cessation rather than a reward. More repetitions are needed using these rewards than with a food reward.

A number of positive reinforcement techniques have been proposed, particularly focussed at delivery of treats or rewards to an animal.

U.S. Pat. No. 3,837,142, Hill, describes a horse bit assembly for controlling and teaching a horse. The bit assembly includes a mouth bar adapted to be received in the horse's mouth; and a pair of L-shaped flanges fixed to opposite ends of the mouth bar to be positioned externally of the horse's mouth on opposite sides of the horse's head to limit movement of the mouth bar while in the horse's mouth. The upper ends of the flanges have apertures for attaching straps to fix the position of the bit assembly on the horse's head, while the lower ends of the flanges have apertures for attaching stopping reins or other lines used to control the horse. Riding reins are attached to the bit assembly by means of rings pivotally connected to each of the flanges adjacent opposite ends of the mouth bar. For applying pressure to nerves in the horse's nose or under the horse's jaw, a generally U-shaped swing bar is rotatably mounted to opposite ends of the mouth bar. Rings are fixed to opposite legs of the swing bar as well as the cross piece for attaching control cords or lines to the swing bar to secure it either across the nose of the horse or under the jaw of the horse depending on the type of control or training wished to be imposed on the horse. Liquid or other medicine may be introduced into the horse's mouth through the mouth bar which is formed with a tubular construction for receiving the liquid; the opposite ends of the mouth bar being provided with screw plugs for closing the mouth bar. When it is desired to introduce liquid into the horse's mouth, either one of the screw plugs is removed, and a liquid supply conduit such as a hose is inserted in the end of the mouth bar. From the interior of the mouth bar, the liquid enters into the horse's mouth by means of an aperture formed in the center of the mouth bar.

The apparatus includes a bit which would cause pressure to the horse's lips, bars and tongue, and the bit has long shanks which would cause a severe leverage effect on the horses' head when it was engaged causing pressure to the horse's poll behind the ears. Further, the device mentions the use of pressure on the nerves of the horse's nose and under the jaw which would cause discomfort and pain. The sudden introduction of liquid into their mouth may cause astonishment in the horse which may inhibit any association between previous behaviour and the arrival of the liquid. The apparatus does not describe a means of repeatedly rewarding the ridden horse in a timely way to facilitate learning by a mounted trainer.

U.S. Pat. No. 4,040,422, Kuhn, describes an animal medication dispenser for introducing food or medicine into an animal's mouth, the device being in the form of a bit having a longitudinally extending cavity, a connector for attaching a supply of medicine to the bit, the connector providing a passage for introducing the medicine to the cavity, and a plunger for moving the medicine through the cavity to a port, the port being positioned to convey the medicine from the bit cavity to the animal's mouth.

This device is useful for introducing medicine into a horse's mouth without the consent of the horse. It employs a hollow bit with a plunger to push medicine contained in the hollow part into the horse's mouth which is useful for manual operation from a person standing on the ground next to the horse. It cannot be used by a ridden person for the purposes of training a moving horse under saddle.

U.S. Pat. No. 4,280,316, Taylor, describes a bridle bit sugar cube holding device formed with a riding horse bridle bit having a rigid mouthpiece provided with an inverted U-shaped curb and having a roller loosely journalled for rotation in opposing directions about the axis of the mouthpiece at the depending limit of the curb. A downwardly open hood is placed over the inverted U-shape curb and is rigidly secured thereto to form a downwardly open chamber within the confines of the curb. An opening is formed in the rearwardly disposed wall of the hood for admitting.

This device is useful for training the horse to accept the bridle but will not allow a mounted rider to repeatedly deliver positive reinforcements immediately following any other behaviours.

U.S. Pat. No. 4,535,724, David, describes a training and care apparatus for horses, operated by the horse rider or trainer, which is combined with the conventional bridle-bit-reins assembly normally used to govern a horse. In addition to and independently from the other means of control available to a horse handler, the apparatus provides means to the rider for rewarding or punishing their horse immediately, in a manner which is neither injurious nor abusive to their mount and which can even be beneficial to the horse's health, according to the horse's behavior or responses to the handler's command. The apparatus control is located and fastened on each one of the two reins, one intended for reward and the other for punishment, in such a manner that the motion of a finger of the hand holding that rein suffices to administer either reward or punishment instantly, as the occasion and circumstances warrant. The power source, the reward punishment media and those media storing and dispensing means are all attached to and supported by the bridle.

This apparatus is intended for reward but also for punishment, which is an ethically unacceptable methodology for the training of horses. Reinforcement whether positive or aversive needs to immediately follow the behaviour with no time delay otherwise there is no possibility of training a horse. The requirement on the horse to identify the taste issued by this apparatus and, further, to conclude whether or not the previous behaviour has been rewarded or punished negates any immediacy and therefore any association with previous behaviour.

Furthermore, this device cannot warn the horse of the unexpected influx of liquid and may therefore cause distraction to the horse as the horse champs their mouth to find out what is there and whether it is pleasant or unpleasant taste and takes a moment to discover for themselves. Horses generally throw their noses up and down to identify a taste in order to fully maximise the effect of a substance in their mouth on their olfactory senses which may present a danger to the rider or handler. Any sudden disturbance of such an intimate nature as the unexpected arrival of liquid in the mouth, particularly unpleasant, may cause a danger to a rider as the horse may react by jumping in surprise or throwing their head up and down.

A horse's sense of taste is highly developed to ensure avoidance of the many toxic plants to be found within the grazing territory. A horse is apprehensive of unfamiliar tastes and is biologically programmed to think that there might be a danger of poisoning if a taste is new or unpleasant. It is a prerequisite of training that the horse be calm and comfortable in all ways so that instead of thinking about danger, discomfort or unpleasantness, the horse will be able to open their mind to the rider and think about the information the rider presents. If the horse finds an unpleasant taste in the mouth, the horse will think about this disturbing matter until the taste has gone and in the meantime will be unable to learn anything.

U.S. Pat. No. 5,557,905, Harding, describes a bit for administering animal medication in which a hollow syringe type medicine applicator in the form of a bar bit wherein the device is placed and affixed in an equine patient's mouth for the purpose of dispensing treatment substances through an aperture of the bit directly onto the surface of the horse's tongue when a plunger is depressed.

The apparatus described allows the controlled introduction of a medicine into the horse's mouth and with a plunger and is not intended to facilitate the training of horses or other animals.

U.S. Pat. No. 5,809,939, Robart, describes an animal training method and apparatus which uses a positive reinforcement bridle bit for dispensing, at will, a pleasant tasting fluid therefrom. This permits the immediate reward of the animal for performing a desired behavior or calming a fear. The invention may be used, for example, for the training of an unbroken colt or green-broke animal, for correction and retraining of problem horses and for further training of previously trained horses.

The use of this animal training bridle bit will have a time delay between the moment the rider initiates the pump and the moment it is received in the horse's mouth. This time delay will compromise its application for training. For example, the time period of delivery may be only 0.25 of a second, but the rider is unable to mark the exact moment of the horse's behaviour and therefore there may be confusion in the horse's mind as to what behaviour is being rewarded. For example, if a rider asked the horse to halt and at the moment of halt the rider initiated the propulsion of the liquid but just at that moment the horse threw their head up, then the horse may not recognise that the reward was for the halt but instead associate the reward with the throwing up of the head. Using only a primary reinforcement (the reward) for the training of the horse will not give a completely precise result. Furthermore even though the liquid may arrive in the mouth as little as 0.25 of a second from the moment it was initiated by the rider, the horse may experience a surprise at an unexpected arrival of liquid in the mouth and take another moment to recover and identify the event as a reward. Thus more time may be lost and the likelihood of their association of the original targeted behaviour may be more remote than ideal for training horses.

Furthermore, while the horse is in motion for example trotting, cantering, galloping and jumping an unexpected arrival of liquid in the mouth may startle the horse and cause the gaits to become erratic thereby endangering their rider. The horse may find the sudden arrival of a liquid in their mouth distracting when they are absorbed in deep concentration during an exercise, for example canter half pass.

This apparatus also does not allow for the initiator mechanism to be mounted in front of the rider for more novice riders who, having to hold the initiator mechanism, may find their rein communication with the horse compromised. The requirement on the rider to hold the actuator may interfere with the rider's normal style of riding and effect the normal communication with the horse. The reservoir in this apparatus is attached to one side of the horse and will not be balanced.

The apparatus here described depends on a modified bit. Great care would be needed to ensure correct fitting to each individual horse regarding the style of bit for that horse's level of training, width of bit for the size of the mouth, width of the bole of the bit depending on size of horse's tongue shape of the roof of the mouth and the width of their bars, and the responsiveness of the horse is and the level of experience of the rider. The bit assembly is restricted for use on horses or other animals who wear bits. It cannot be used for animals who wear bitless bridles or no bridles.

U.S. Pat. No. 5,566,645, Cole, describes a method of animal training by facilitating the delivery of a primary reinforcement reward substance to the animal simultaneously with, or immediately following the exhibition of desired behaviour by the animal.

As described above with respect to other documents, this apparatus is only capable of providing a liquid reward to the animal. However, the animal does not have any warning that the reward is coming which may have a delaying factor or an adverse reaction.

There will also be a delay in administering the reward which will limit the effectiveness. For example, even if the various pumps, syringes, plungers and hand held bulbs can achieve a reasonably quick delivery, for example, 0.25 second delivery from the initiator to the horse's mouth down the approximately 1 meter of delivery tube, this is still not the exact, precise instant at which an action was performed. In addition to this period of time of delivery the horse would need the time to recognise that a reward had arrived in their mouth, taste it and process the information, and connect it to the previous behaviour. This acknowledgement time added to the delivery time would be longer than ideal to be precise about the required behaviour which would considerably reduce the effectiveness of the tool.

Without warning of any kind the horse may be startled to find the sudden arrival of a liquid in their mouth and this may cause various reactions ranging from loss of concentration to alarm which may compromise the rider's safety if the horse should toss their head or become tense. There may also be some latent stress associated with the apparatus if a sensitive horse is concerned with the possibility of unexpected arrival of liquid in the mouth and this may adversely affect their work and reduce the benefits of training.

This apparatus also describes how the delivery tube can be attached to the neck of the horse. However, the proposed arrangement will restrict the motion of the horse's head and neck, which is problematic since horses need to adjust the position and length of the neck for optimal balance, for example when performing endurance, reining, dressage, and jumping. For example, on the approach to a jump the neck is drawn up, whilst over the jump the horse's neck and head stretch forward. This can mean a difference of neck length of more than half a meter. If the apparatus does not allow the horse to stretch their neck forward then the apparatus would restrict the horse and compromise the training.

Furthermore, if the horse tried to stretch the neck and head forward this could result in the pulling apart of the apparatus during use. If the delivery tube became detached at the rider's hand, this may result in a safety issue with over a meter of delivery tube freely dangling while the horse is in motion, risking injury to the horse's jaw if they should tread on it. The horse's jaw is very vulnerable to injury if there is downward pressure such as that caused by getting a foot caught in a rein or anything attached to their bit. If the delivery tube became detached at the horse's head this could startle the horse to cause erratic behaviour, introducing risk to the rider. If the apparatus allows for a delivery tube long enough to allow unrestricted movement of the horse's head then the excess tubing when the horse's head was up could compromise the safety of the rider if it got caught on the rider, or flapped about while the horse is in motion startling them, or got caught on bushes in passing.

Another difficulty is that there is no degree of modularity for the easy and safe disconnection of the saddle and bridle components of the apparatus to safely put it on or safely take it off.

U.S. Pat. No. 7,497,186 describes an animal self-carried hydrating system comprising an animal harness, a fluid container for holding the fluid, and a fluid dispensing mechanism. The animal harness is securable on the animal by a fastening system. The animal harness has a fluid pocket for holding the fluid container. The fluid dispensing mechanism is attached to the fluid container, in fluid communication with the fluid in the fluid container. The fluid dispensing mechanism is such that it can dispense fluid from the fluid container to the animal while the fluid container is in the fluid pocket.

This apparatus is useful for the hydration of an animal but it is not designed for the training of an animal.

U.S. Pat. No. 7,073,688 describes a personal hydration system with component connectivity. The hydration system includes a fluid reservoir and may be housed within a pack. Drink fluid is drawn from the reservoir through a drink tube to a mouth-piece. In some embodiments, the drink tube is connected to the reservoir at an exit port, the hydration system includes a manually actuated on/off valve, a filter, a pump, and/or a bite-actuated mouthpiece. The quick-connect assembly fluidly interconnects components of the hydration system and is configured to quickly release, and permit reattachment of, the detached components or replacement components. In some embodiments, the replacement components enable different performance from the detached components. In some embodiments, the quick-connect assembly is adapted to selectively couple a bite-actuated mouthpiece and a gas mask adapter to the drink tube. In some embodiments, at least a portion, if not the entire, hydration system is formed from a chemically resistant material.

This apparatus is designed for the self-hydration of the wearer and it is not designed to train the wearer to learn behaviours required by a third party, for example a rider or handler.

US20070074668 describes an animal training device that includes a housing defining an internal compartment, a noise producing element with the housing, a tray extending from the front of the housing and a button. Pressing the button dispenses a food treat from the compartment and causes the noise producing element to emit a noise.

This apparatus cannot dispense a positive reinforcement to facilitate training for any other behaviour than that in which the animal presses the button on the apparatus. The animal can only be rewarded for pressing the button while stationary and only that specific button which is on the apparatus. It is not intended to be worn by a moving animal nor to allow the trainer to train any other behaviours.

WO95/20871, Lister, describes a device for training horses including a fluid outlet adapted for placement into the horse's mouth for releasing a supply of fluid directly into the horse's mouth for rewarding or deterring the animal, a reservoir for holding a supply of fluid; a delivery pipe connecting the reservoir to the outlet; and means for controlling the release of the fluid into the animal's mouth. A sugar or salt solution may be delivered directly into the animal's mouth to encourage or deter behavioural aspects of the horse when training.

Reinforcement whether positive or aversive needs to immediately follow the behaviour with no time delay otherwise there is no possibility of training a horse. Even if the liquid is propelled quickly there will still be some delay, if only for 0.25 of a second, which may be enough time to allow an intermediate event to happen so that the horse could be confused.

This device cannot warn the horse of the influx of liquid and may, if it is unexpected, cause a distraction to the horse as the horse champs their mouth to find out that there is a liquid in their mouth and takes a moment to take in this information. The length of time of the delivery of the liquid to the mouth added to the time it takes the horse to recognise the presence of something in the mouth will, combined, be too much time to associate the taste with a previous behaviour for it to be of value in training.

Any sudden disturbance such as the unexpected arrival of liquid in their mouth, particularly unpleasant, may cause a danger to a rider as the horse may jump in surprise or throw their head up and down or, if unpleasant, try to rid themself of the liquid or the bit by rubbing their face on their leg.

Furthermore a horse is biologically programmed to think that there might be in danger if a taste is new or unpleasant. It is a prerequisite of training that the horse be calm and if an unpleasant taste is found in the mouth the horse will think that there is a danger and be concerned with trying to get rid of it and be unable to learn anything.

This device does not allow any extensibility of the delivery tube between the reservoir and the initiator which would either limit the positioning of the rider's hand and the horse's head and neck or constitute a safety issue with a loop of delivery tube likely to catch onto fixed objects in passing or the possibility of the delivery tube coming apart during use risking rider safety and horse safety.

This device has no modularity between the saddle mounted reservoir and the bridle components which would be a safety and convenience issue for putting it on the horse and taking it off the horse.

U.S. Pat. No. 6,953,007, Cummings, describes a pet training device comprising a rigid tube formed with at least one elbow, and having a cavity in at least the distal end thereof for insertion of edible rewards therein; a handle, attached at the proximal end of the rigid tube, a flexible plunger rod disposed within the rigid tube, comprising a proximal end extending through the handle, and a distal end extending proximate to the cavity in the distal end of the rigid tube; a thumb ring joined to the proximal end of the flexible plunger rod; and a plunger disposed within the cavity and joined to the distal end of the flexible plunger rod, wherein a user of the device may hold the rigid tube by the handle, move the thumb ring, and cause an edible reward to be dispensed from the cavity on the distal end of the rigid tube.

This apparatus is useful to reward an animal but it would need to be carried by the user and not the animal and may be unsuitable for use while riding a horse. This apparatus is not harnessed to the targeted pet, rather the pet comes up to the apparatus and takes the reward when the reward is released by the trainer. It is unlikely that a rider would be able to safely operate the reins and hold the apparatus on a moving horse. The capacity of the apparatus is suited to the smaller companion animal instead of such a large animal as a horse. The tube whereby the reward travels from the handler to the pet is rigid which would be difficult to use safely around a horse and may cause alarm as it may be interpreted by the horse to be a whip.

Thus, the above described techniques typically suffer from a number of disadvantages. In particular, administering a fluid to the animal takes time, and there is therefore typically a delay between the behaviour of the animal to be rewarded and the receipt of the reward. This makes it difficult for the animal to associate the reward with the behaviour, and thereby limits the effectiveness of such techniques to adequately train the animal. The sudden arrival of unexpected fluid into the horse's mouth may alarm the horse which could interrupt their thoughts, detracting from the learning opportunity, or it could introduce an element of surprise and fear and the horse's reaction could compromise the safety of the rider.

SUMMARY OF THE PRESENT INVENTION

In a first broad form the present invention seeks to provide a trigger arrangement for an animal training apparatus, the trigger arrangement including:
  a) a fluid pump having a pump actuator, the pump including an inlet and an outlet; and
  b) a sound emitter configured to be actuated by the pump actuator, wherein actuation of the outlet pumps fluid from the inlet to the outlet accompanied by a simultaneous emission of sound from the sound emitter.

Typically the trigger arrangement includes a housing containing the fluid pump and the sound emitter, the pump actuator being pivotally mounted to the housing to allow actuation of the pump and sound emitter.

Typically the pump actuator includes first and second engaging portions arranged so that pivotal movement of the pump actuator causes the first and second engaging portions to engage and activate the pump and the sound emitter respectively.

Typically the housing is shaped to be held in use.

Typically the housing includes a coupling mechanism for coupling the trigger arrangement to a dock.

Typically the housing includes a magnet for magnetically coupling the housing to the dock.

Typically the inlet is coupled to an inlet tube for coupling the pump to a reservoir assembly.

Typically the inlet tube includes a connector for connecting the inlet tube to a connecting tube of the reservoir assembly.

Typically the outlet is coupled to an outlet tube for connecting the pump to a mouth nozzle for dispensing fluid into a mouth of an animal.

Typically the outlet tube includes an outlet tube connector for connecting the outlet tube to a delivery assembly including the mouth nozzle.

Typically the delivery assembly includes a delivery tube extending from a delivery tube connector to the mouth nozzle, the delivery tube connector being for coupling to the outlet tube connector.

Typically the delivery assembly includes at least one clip for mounting the delivery tube to a bridle of a horse.

Typically the delivery tube is adapted to extend along reins to a bridle of a horse.

Typically the trigger arrangement includes a mount for mounting the trigger arrangement to a harness of an animal.

Typically the sound emitter includes a clicker.

Typically a volume of sound produced by the sound emitter is adjustable.

Typically the pump actuator is cantilevered to the fluid pump to define a low profile and to facilitate actuation of the pump.

Typically the pump actuator is configured to wirelessly actuate the pump and the sound emitter.

Typically the sound emitter can emit different sounds.

Typically the sound emitter includes a control for emitting a sound without the issue of the reward.

Typically the sound emitter includes a control for allowing a user to select different sounds.

In a second broad form the present invention seeks to provide a reservoir assembly for an animal training apparatus, the reservoir assembly including:
  a) at least two opposed supports configured for fitment over a back of an animal so that a support rests on either side of the animal;
  b) a reservoir for storing fluid having at least two flexible bladders that are each receivable on a respective support; and
  c) an outlet arranged in fluid communication with the reservoir, said outlet configured for attachment to a trigger arrangement, the trigger arrangement including:
    i) a fluid pump having a pump actuator, the pump including an inlet and an outlet; and
    ii) a sound emitter configured to be actuated by the pump actuator, wherein actuation of the pump pumps fluid from the inlet to the outlet accompanied by a simultaneous emission of sound from the sound emitter.

Typically the bladders are arranged in fluid communication with each other.

Typically the bladders are arranged in fluid communication with each other via a connecting tube, the connecting tube being connected to the inlet via an inlet tube.

Typically the supports are pouches.

Typically the reservoir assembly includes a dock for receiving the trigger arrangement.

Typically the bladders include at least one sealable opening to facilitate refilling of the reservoir.

In a third broad form the present invention seeks to provide an animal training apparatus which includes:
  a) a delivery assembly having a delivery conduit arranged in fluid communication with a mouth nozzle, the nozzle configured for dispensing fluid into a mouth of an animal;
  b) a reservoir assembly for storing fluid;
  c) a trigger arrangement including:
    i) a fluid pump with a pump actuator, the pump having an outlet arranged in fluid communication with the delivery conduit and an inlet arranged in fluid communication with the reservoir; and
    ii) a sound emitter configured to be actuated by the pump actuator, wherein actuation of the pump pumps fluid from the reservoir to the mouth nozzle accompanied by a simultaneous emission of sound from the sound emitter.

Typically the delivery assembly includes a delivery tube extending from a delivery tube connector to the mouth nozzle, the delivery tube connector being for coupling to the outlet of the trigger arrangement.

Typically the delivery assembly includes at least one clip for mounting the delivery tube to a bridle of a horse.

Typically the delivery tube is adapted to extend along reins to a bridle of a horse.

Typically the delivery assembly includes an inlet connector separating the delivery tube into detachable first and second conduits.

Typically the second conduit includes an extensible conduit arranging the pump outlet and the inlet connector in fluid communication.

Typically the extensible second conduit includes a mane attachment configured for attaching the second conduit to a mane of the animal.

Typically the delivery assembly includes a check valve to prevent the animal from sucking fluid from the delivery nozzle.

Typically the reservoir assembly includes:

Typically the reservoir assembly includes:
  a) at least two opposed supports configured for fitment over a back of an animal so that a support rests on either side of the animal;
  b) a reservoir for storing fluid having at least two components that are each receivable on a respective support; and
  c) an outlet arranged in fluid communication with the reservoir, said outlet configured for attachment to a trigger arrangement.

Typically the mouth nozzle includes a clip for attaching said nozzle to a bit.

A trigger arrangement, a reservoir assembly, and animal training apparatus, substantially as hereinbefore described.

A trigger arrangement, a reservoir assembly, and animal training apparatus, substantially as hereinbefore described and illustrated with reference to the accompanying drawings.

BRIEF DESCRIPTION OF THE DRAWINGS

An example of the present invention will now be described with reference to the accompanying drawings, in which: —

FIGS. 12 to 14 show schematic exploded, side and cross sectional views of the fluid pump of FIG. 10;

DETAILED DESCRIPTION OF THE PREFERRED EMBODIMENTS

Figure 1:
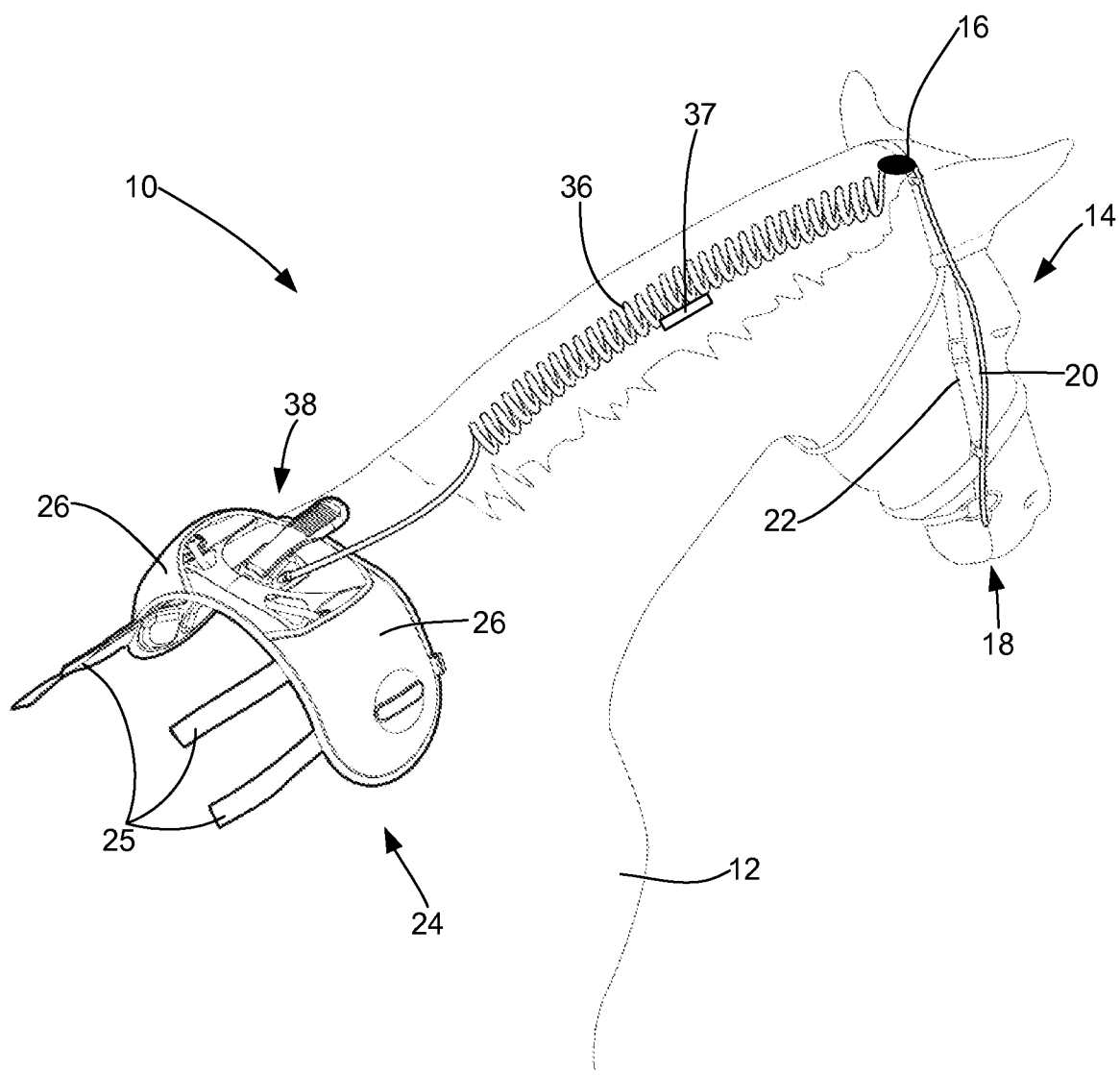
FIG. 1 shows a schematic perspective view of animal training apparatus fitted to a horse.
Figure 2:
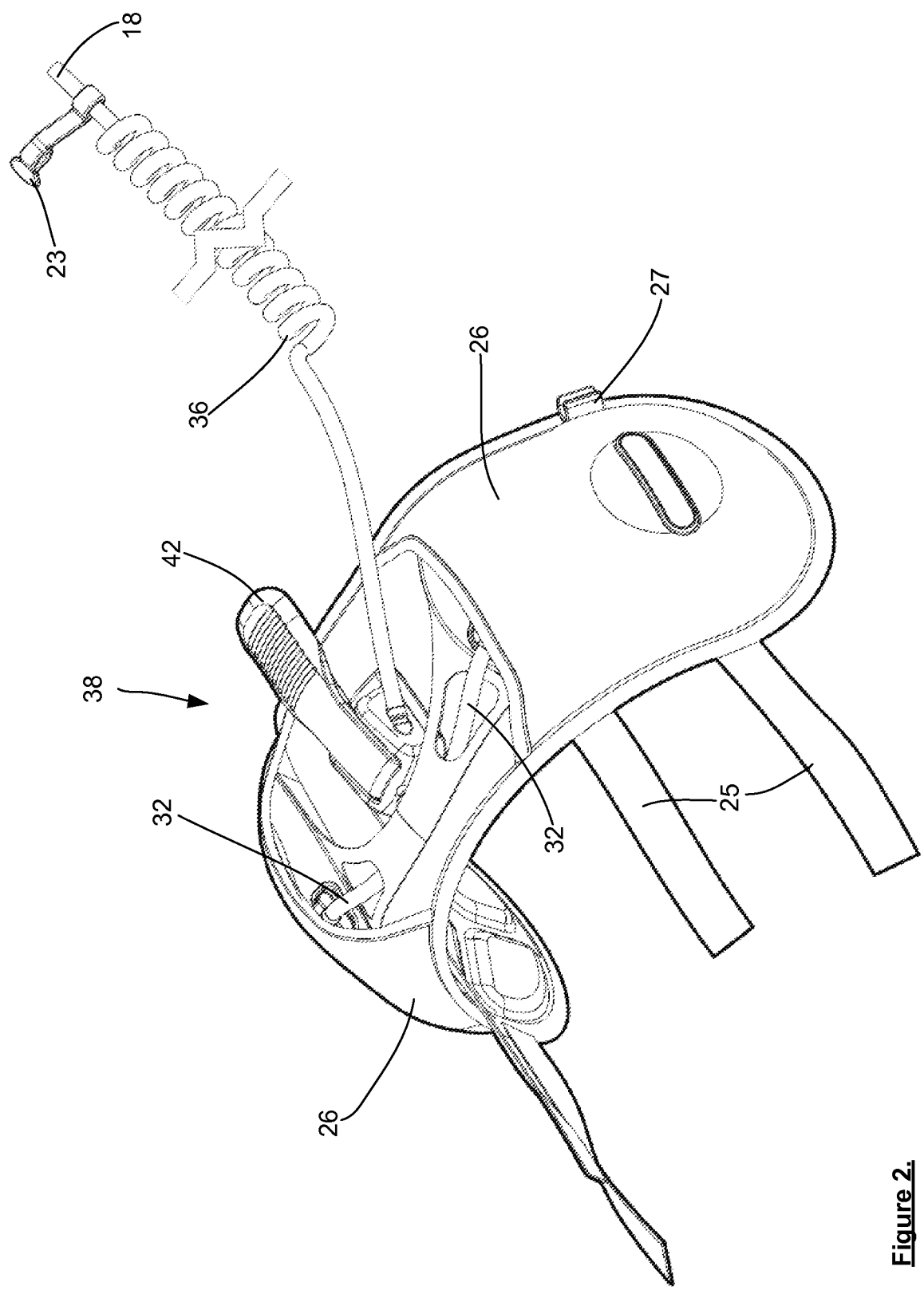
FIG. 2 shows a schematic perspective view of the animal training apparatus of FIG. 1.
Figure 3:
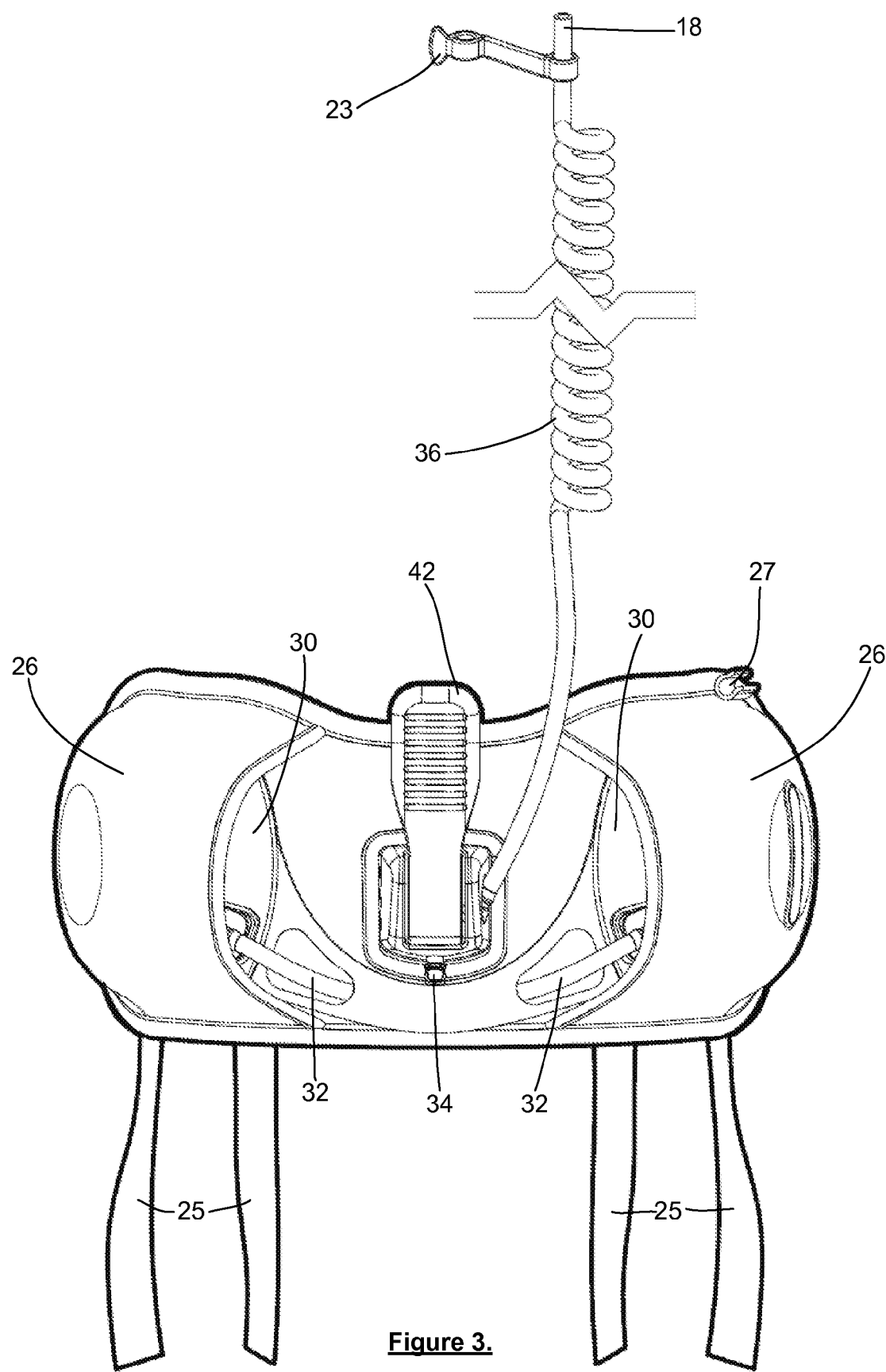
FIG. 3 shows a schematic top view of the animal training apparatus of FIG. 1.

With reference to FIGS. 1 to 9, there is shown a first example of an animal training apparatus 10. In the shown example, the apparatus 10 is fitted to a horse 12. However, it is to be appreciated that the apparatus 10 can be used with any kind of suitable animal, e.g. donkeys, ponies, mules, camels, elephants, or the like. The apparatus 10 finds particular application in the field of positive behaviour enforcement training of animals, where an animal is rewarded for complying with a command or performing a desired action.

In general, the apparatus 10 includes a delivery assembly 14, a reservoir assembly 24 and a trigger arrangement 38. The reservoir assembly 24 and trigger arrangement 38 are typically positioned on the back of the animal 12, as shown.

The reservoir assembly 24 is for storing liquids and typically includes two opposed pouches 26 that are configured for fitment over the back of the animal 12 so that a pouch 26 rests on either side of the animal 12, as shown. In a further example, the reservoir assembly 24 may be carried by a rider or trainer of the animal 12. In other examples of the invention, the reservoir assembly 24 may include a different number of pouches, if required. The assembly 24 also includes a reservoir 28 which, in one example, is comprised of two flexible bladders 30 that are each receivable in a respective pouch 26. The bladders 30 are typically arranged in fluid communication with each other by means of connecting tube 32. Whilst flexible bladders are described, this is not essential, and non-flexible containers, such as bottles, or the like could be used. The term bladder should therefore encompass any liquid container and should not be restricted to flexible containers.

Connecting tube 32 is generally used to ensure that equal amounts of liquid are present in the respective bladders 30 so that the reservoir assembly 24 is balanced on the back of the animal 12. In the example shown, the connecting tube 32 further functions to connect an outlet 34 to the trigger assembly 38. However, in other examples, the connecting tube 32 may be a separate fluid connection arranging lower portions of the bladders 30 in fluid communication to ensure gravity-assisted equalisation of fluid level, or the like. Alternatively, connecting tube 32 may be left out entirely, for example in cases where each bladder 30 stores a different fluid. In such a case, each bladder 30 would have a separate outlet and/or tube leading to the trigger assembly 38.

For example, one bladder 30 can hold water and the other bladder an isotonic liquid, a medicinal fluid, and/or the like. The reservoir assembly 24 may include valves and/or switches so that fluid is only able to be drawn from one bladder at a time. Alternatively, the trigger arrangement 38 can draw fluid from both bladders 30 simultaneously, e.g. mixing of different fluids takes place in the trigger assembly 38. The bladders 30 may also include a transparent window through which a fluid level can be checked.

The reservoir assembly 24 also includes a mount in the form of mounting straps 25 for mounting the assembly 24 to a harness or saddle (not shown) of the animal 12. It is to be appreciated that other examples can include different mounts 25, e.g. rings, clips, harnesses, etc. The reservoir assembly 24 also typically defines a point to which the trigger arrangement 38 can be fastened in between the pouches 26, as shown, so that the trigger arrangement 38 is operatively located on the back of the animal and within easy reach of a rider of the animal 12.

Figure 4:
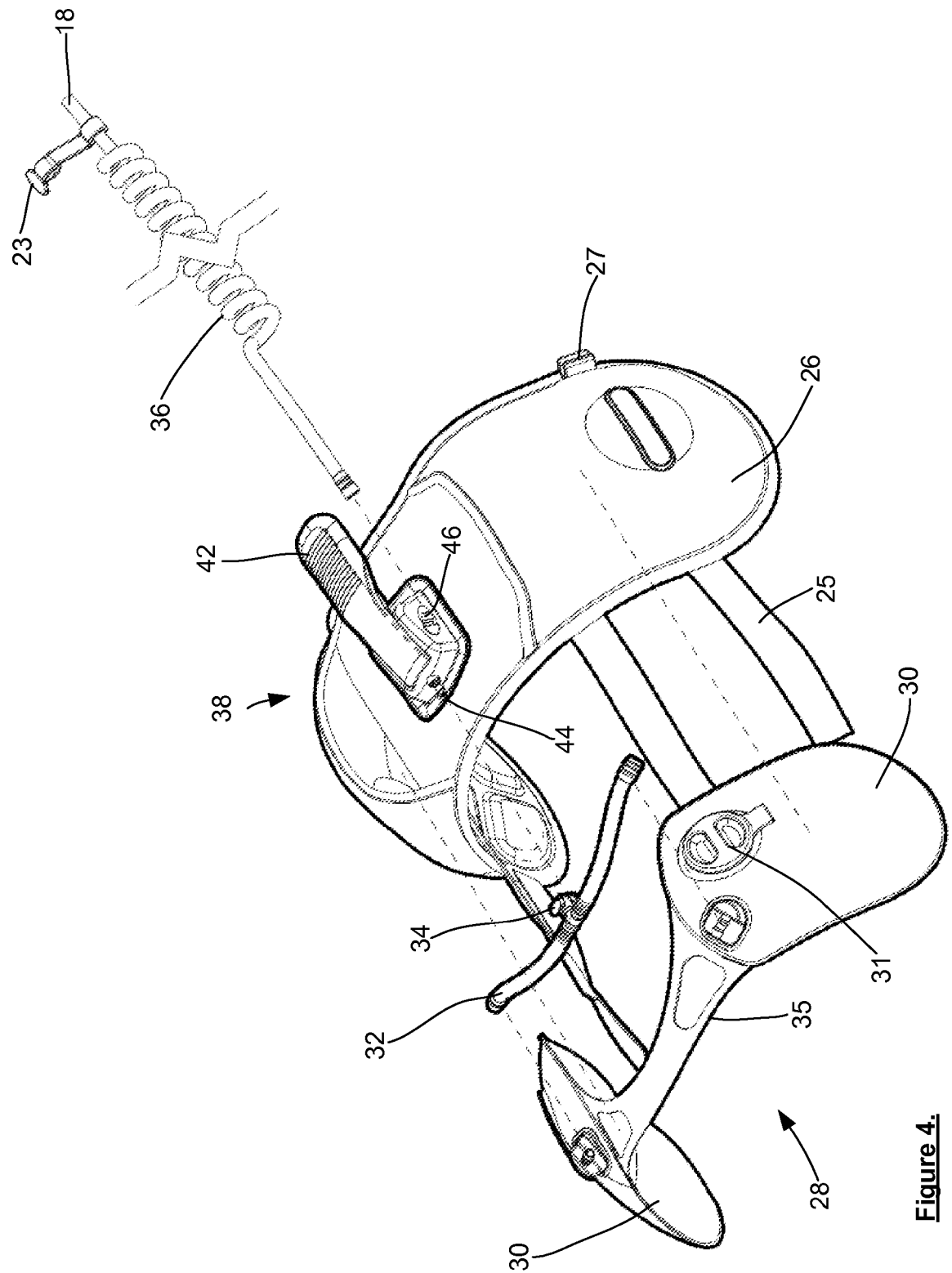
FIG. 4 shows a schematic exploded view of the animal training apparatus of FIG. 1.
Figure 5:
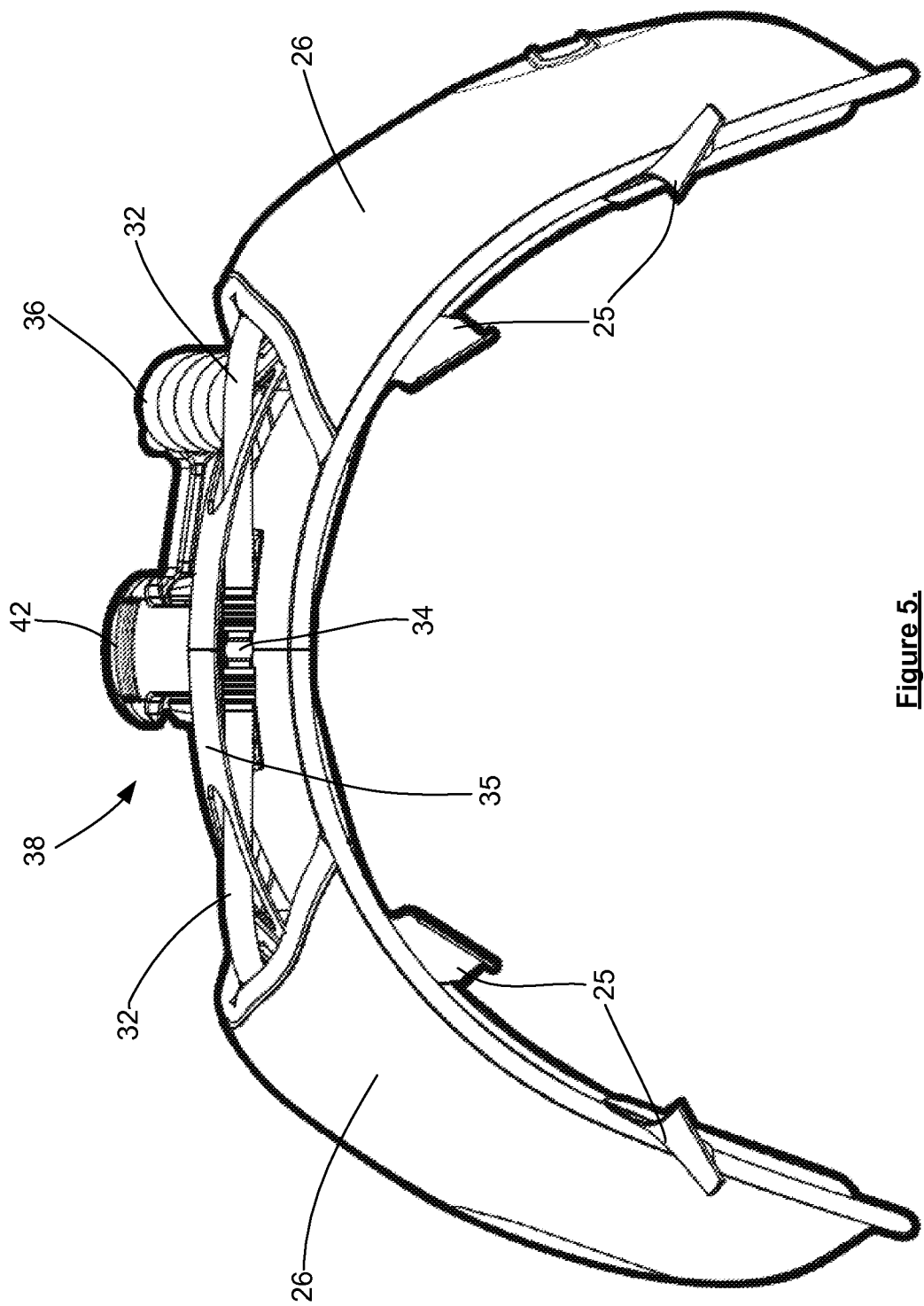
FIG. 5 shows a rear schematic view of a reservoir assembly of the animal training apparatus of FIG. 1.
Figure 6:
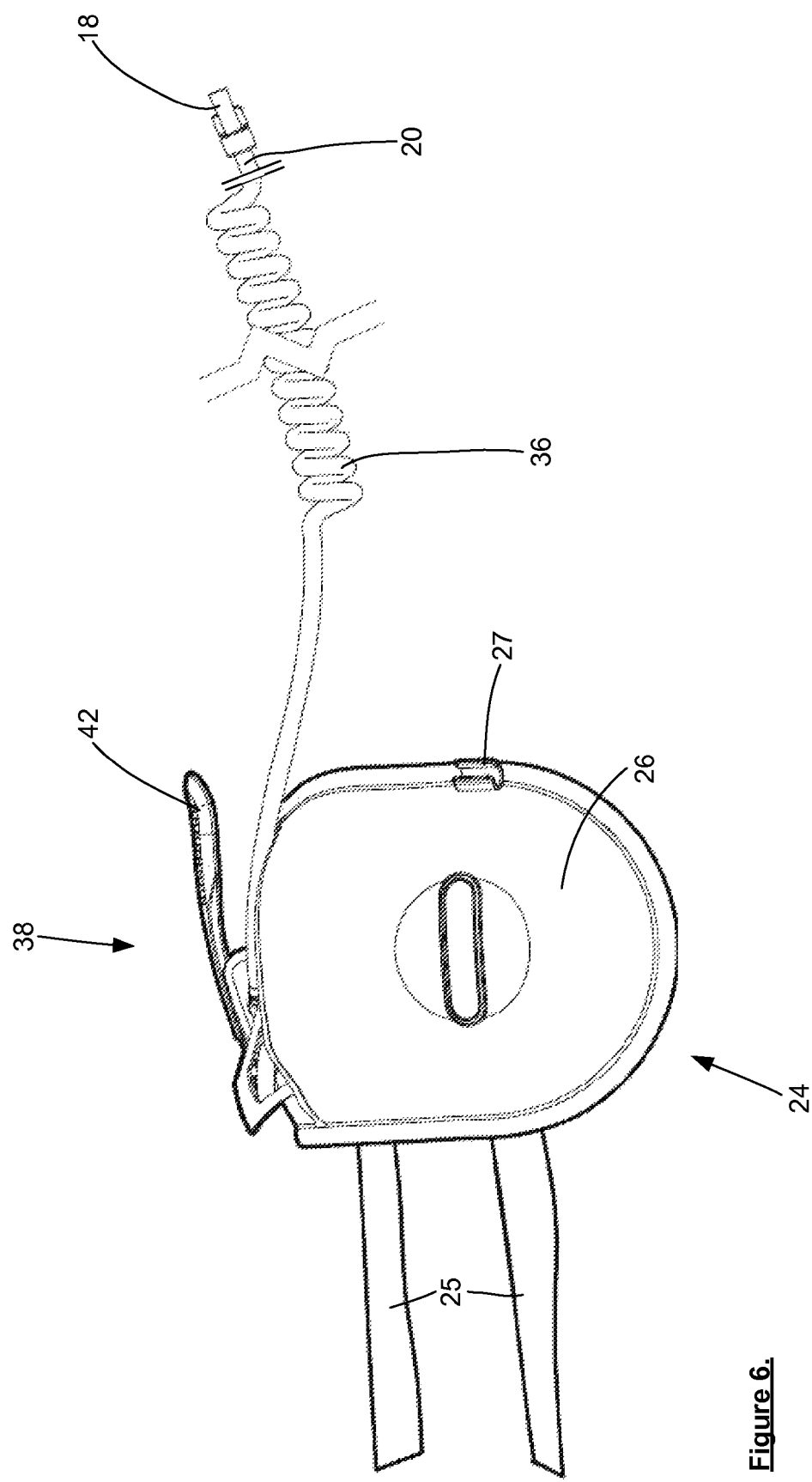
FIG. 6 shows a side schematic view of the animal training apparatus of FIG. 1.

FIG. 4 shows additional detail of the reservoir assembly 24. The bladders 30 are typically connected together to facilitate ease of handling and removal from the pouches 26 for refilling. In the current example, the bladders 26 are connected together by means of connecting strap 35, as shown. The bladders 30 also typically include a sealable opening 31 to facilitate refilling of the reservoir 28. In examples where the bladders 30 are arranged together in fluid communication, e.g. via connecting tube 32, the reservoir 28 may include a single opening 31. In the example shown, each bladder 30 includes its own refill opening 31. It is to be appreciated that different arrangements are possible and fall within the scope of the invention.

The bladders 30 are typically manufactured from a flexible material, such as rubber, a suitable polymer, or firmer material, such as a blow moulded plastic, or the like, to conform to the side of the animal and be comfortable to the animal 12. The pouches 26 are typically made from a fabric material for similar reasons, although alternatively any other material may be used. In one example, the pouches can be made from an insulating material to maintain a temperature of liquid in the bladders. In the example shown, the reservoir assembly 24 includes a retaining clip 27 for receiving and retaining a nozzle 18 or conduit 20, 36 of the apparatus 10, as described in more detail below. The clip 27 is useful to secure the nozzle or conduit 20, 36 when the apparatus 10 is not in use, or the like.

The trigger arrangement 38 (shown in more detail in FIG. 9) includes a fluid pump 40 having a pump actuator 42, with the pump 40 having an inlet 44 and an outlet 46, as shown. The trigger arrangement 38 also includes a sound emitter 48 which is configured to be actuated by the pump actuator 42. In this manner, actuation of the pump 40 via the actuator 42 pumps fluid from the inlet 44 to the outlet 46 whilst at the same time an emission of sound is produced from the sound emitter 48. The pump actuator 42 could be of any suitable form, such as a button, lever, or the like, and the term trigger is therefore intended to refer to the process of actuating the pump and sound emitter and is not intended to imply any restriction on the form of the pump actuator 42.

The inlet 44 typically includes a quick-release attachment configured to receive the outlet 34 of the reservoir assembly 24, as described above. Similarly, the outlet 46 typically includes a quick release attachment configured to receive a conduit 36, as shown. In the shown example, the trigger arrangement 38 is fitted to the reservoir assembly 24, as described above. However, in further examples, the trigger arrangement 38 may include a saddle or harness mount (not shown) for mounting the trigger arrangement 38 to a saddle or similar harness of the animal 12, or the like.

The conduit between the reservoir and the trigger arrangement is extensible to allow the forward movement of the hand if the user should wish to hold the reins with the trigger demounted. The extensible section allows for the neat coiling of the conduit for safe accommodation of the extra length. It will be appreciated that the conduits can be formed from any suitable material, and can be coiled or otherwise extensible, as required. It will therefore be appreciated that the terms conduits and tubes are used interchangeably and are not intended to be limiting.

The pump actuator 42 is typically cantilevered to the fluid pump 40 to define a low profile and to facilitate actuation of the pump 40. Typically, the actuator 42 is pressed down to actuate the pump 40 and the sound emitter 48. However, different examples can have different configurations, e.g. a button actuator, a pull-handle actuator, a remote actuator, or the like. For example, the apparatus may include a wireless pump actuator configured to wirelessly activate the pump and the sound emitter, such as a remote control device, or the like. Such a wireless actuator configuration may include an electromagnetic wave transmitter and receiver for activating an electric motor pump, or the like.

The sound emitter 48 is typically a clicker-type device used for animal training adjusted to a low volume for the acute hearing of the horse. However, any suitable sound emitter 48 can be used which is actuated by the pump actuator 42 and emits a sound, such as an electronic emitter, a whistle-type emitter, or the like. For example, the sound emitter 48 may be configured to produce sound due to the pressurised flow of fluid through the delivery conduit. In one example, the trigger arrangement 38 can be configured so that the actuator 42 does not actuate the sound emitter 48 in certain circumstances. For example, the trigger arrangement 38 may include a switch to deactivate the sound emitter 48 so that the pump 40 is able to pump fluid without any emission of sound from the sound emitter 48. In addition, the sound emitter 48 may include a volume control to control a volume of sound emitted.

A further alternative is for the sound emitter to produce different sounds depending on the circumstances. For example, a first sound could be used with the delivery of a reward, with a second sound being used without the reward for intermittent confirmation of correct behaviour. To achieve this, the sound emitter may include a switch or other control for allowing the user to select the different sounds as required. The system may include the facility to change the sounds so that each rider could select a sound of choice to allow different horses working together in the same area to be trained to the meaning of their own specific sound or sounds and not expectant of reward on hearing another rider issue a sound for the training of that other rider's horse. The sound system also allows for a sound to be used to indicate to the horse that behaviour was not the correct one, as well as to allow a sound to be emitted without the issue of the reward, for example by using a separate activation mechanism.

Figure 7:
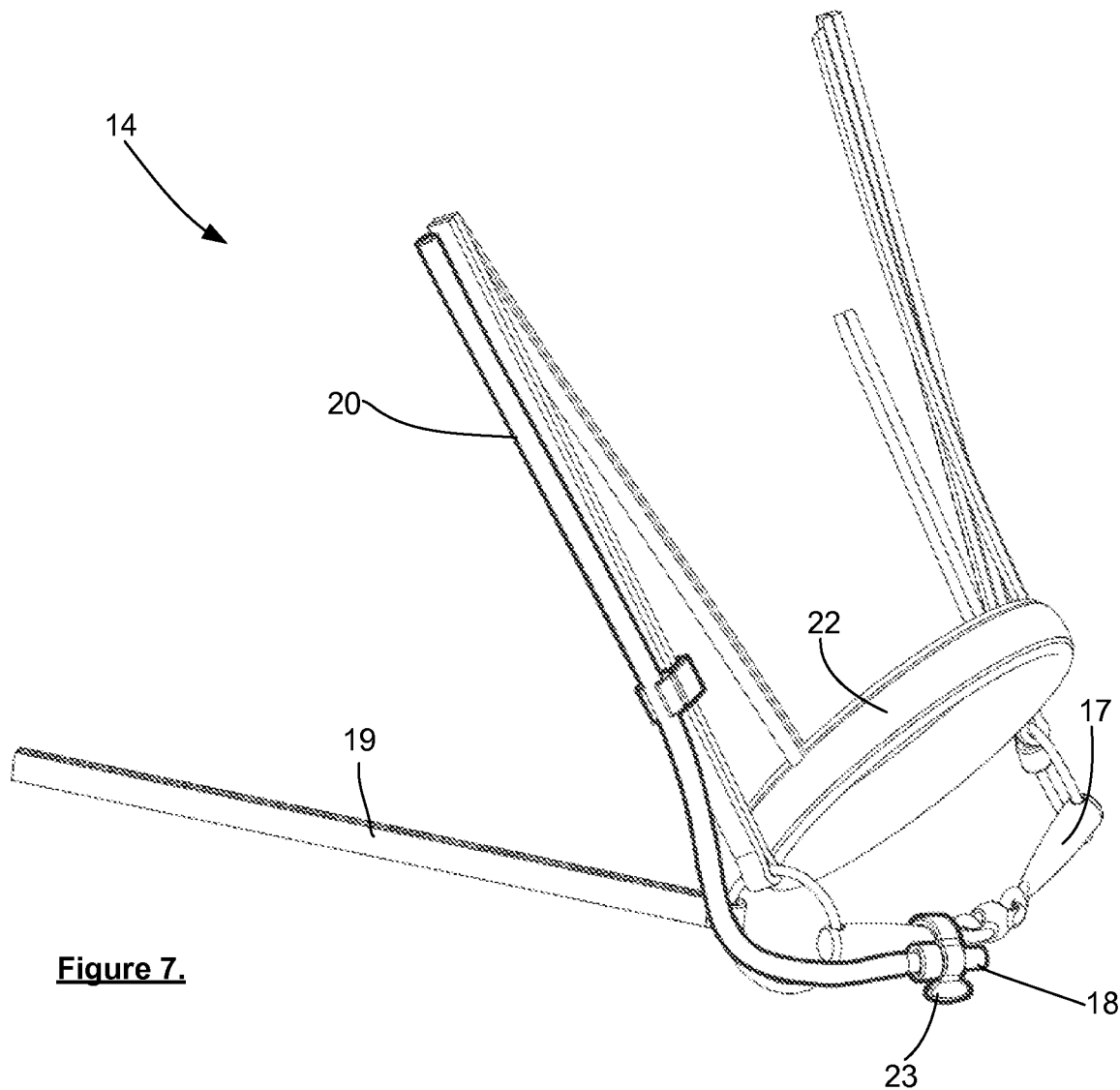
FIG. 7 shows a schematic perspective view of a delivery assembly of the animal training apparatus of FIG. 1.
Figure 8:
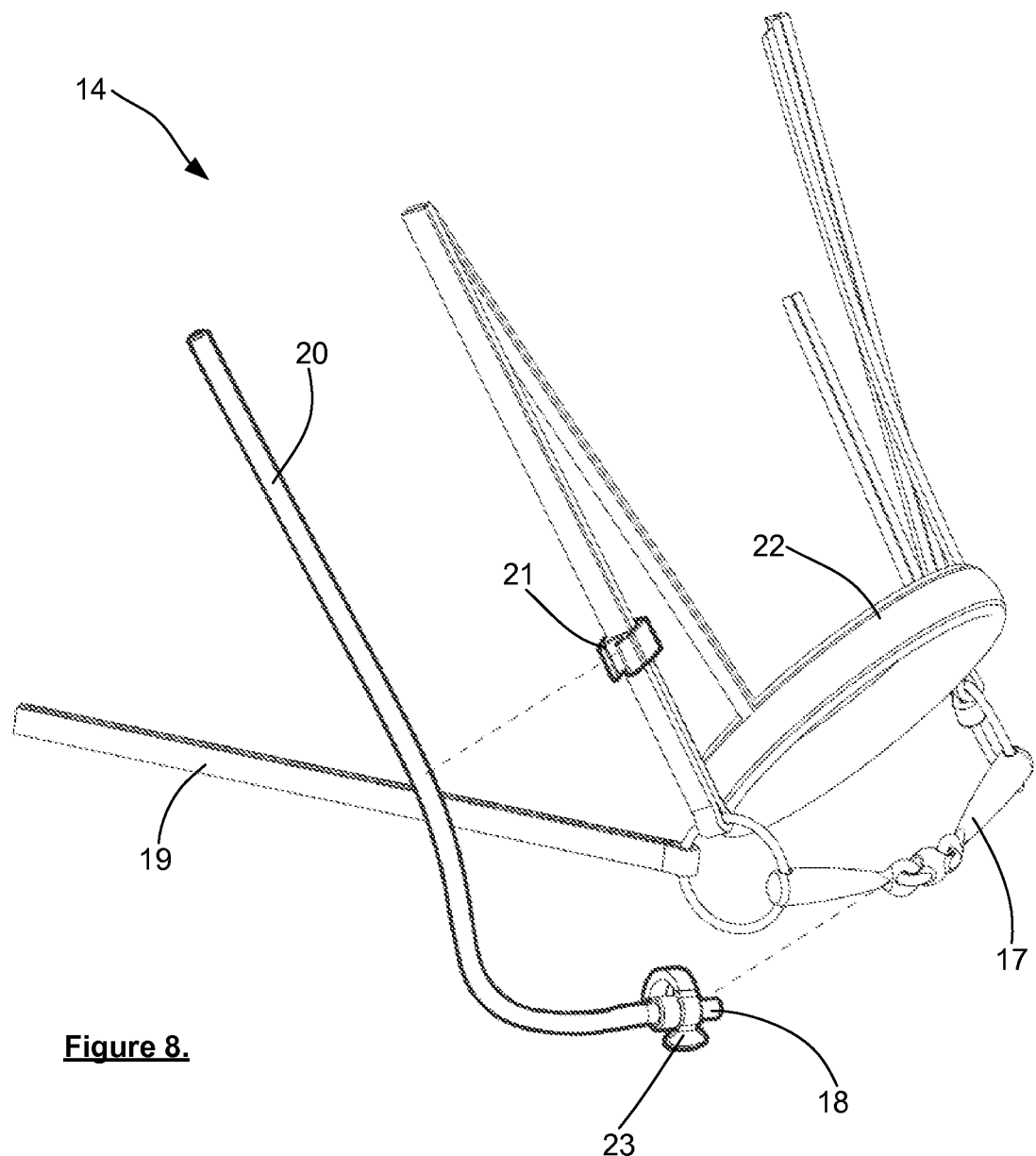
FIG. 8 shows schematic exploded view of the delivery assembly of FIG. 7.
Figure 9:
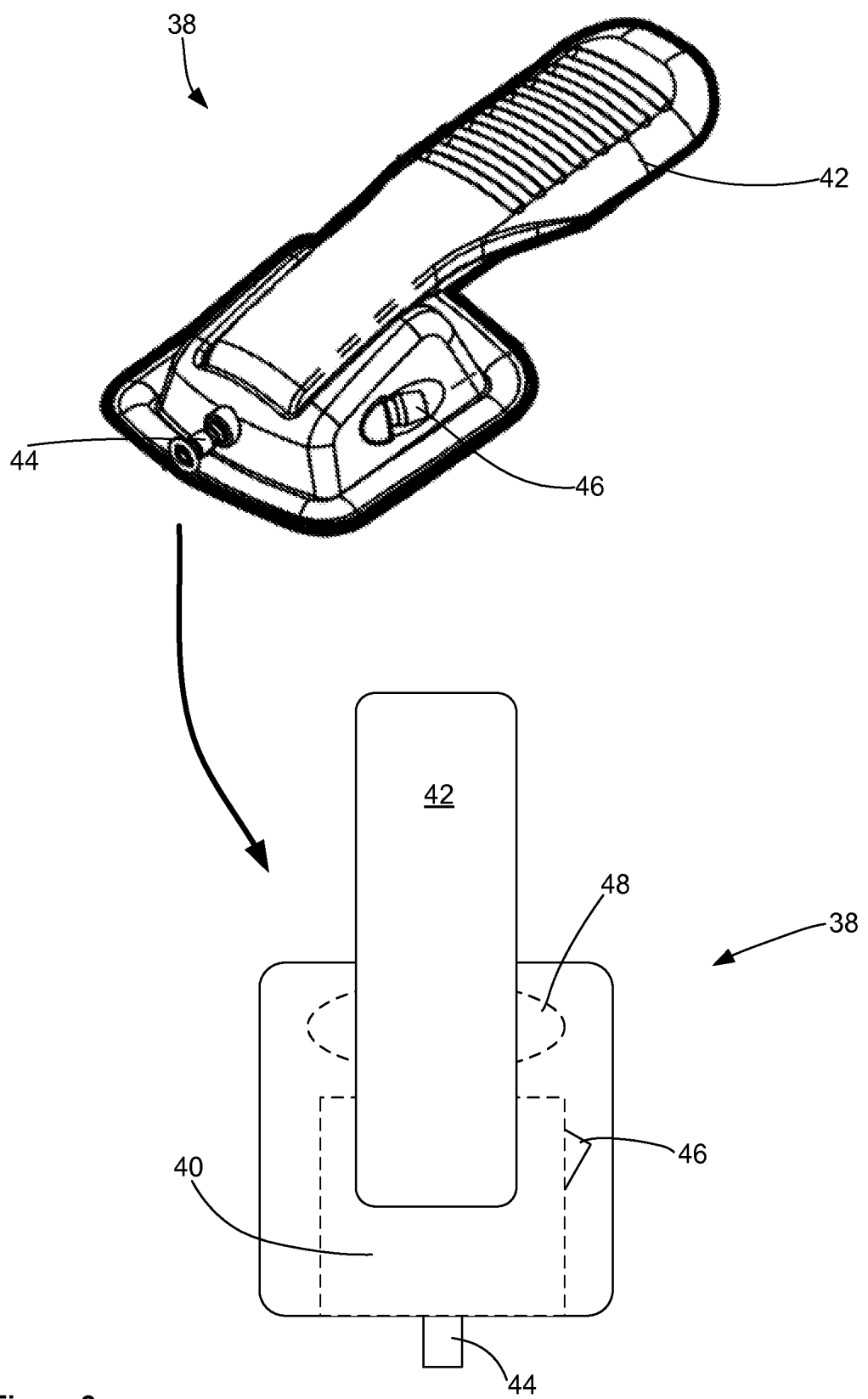
FIG. 9 shows a diagrammatic perspective and top representation of a trigger arrangement of the animal training apparatus of FIG. 1.
Figure 10:
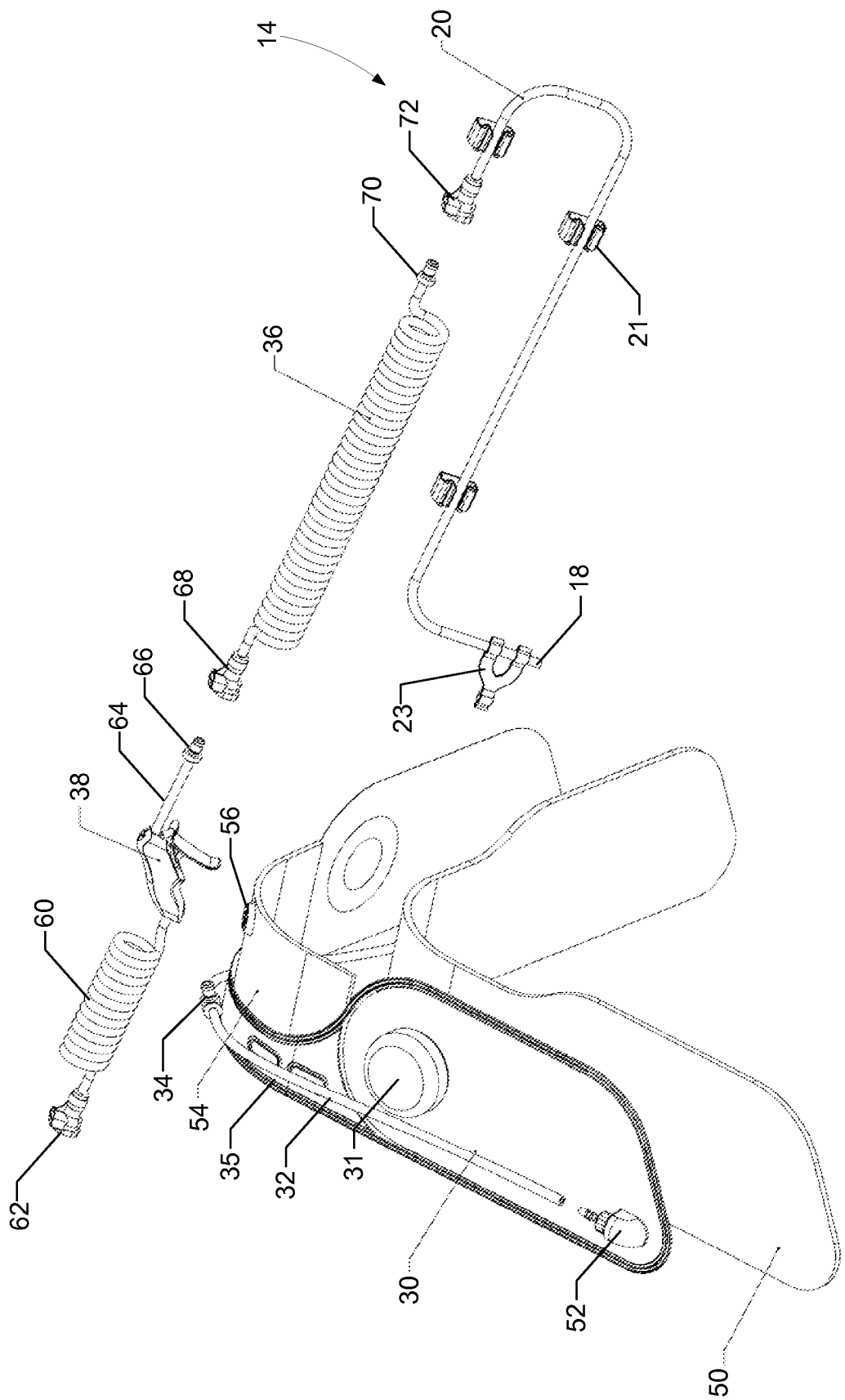
FIG. 10 shows a schematic perspective view of a second example of animal training apparatus.
Figure 11:
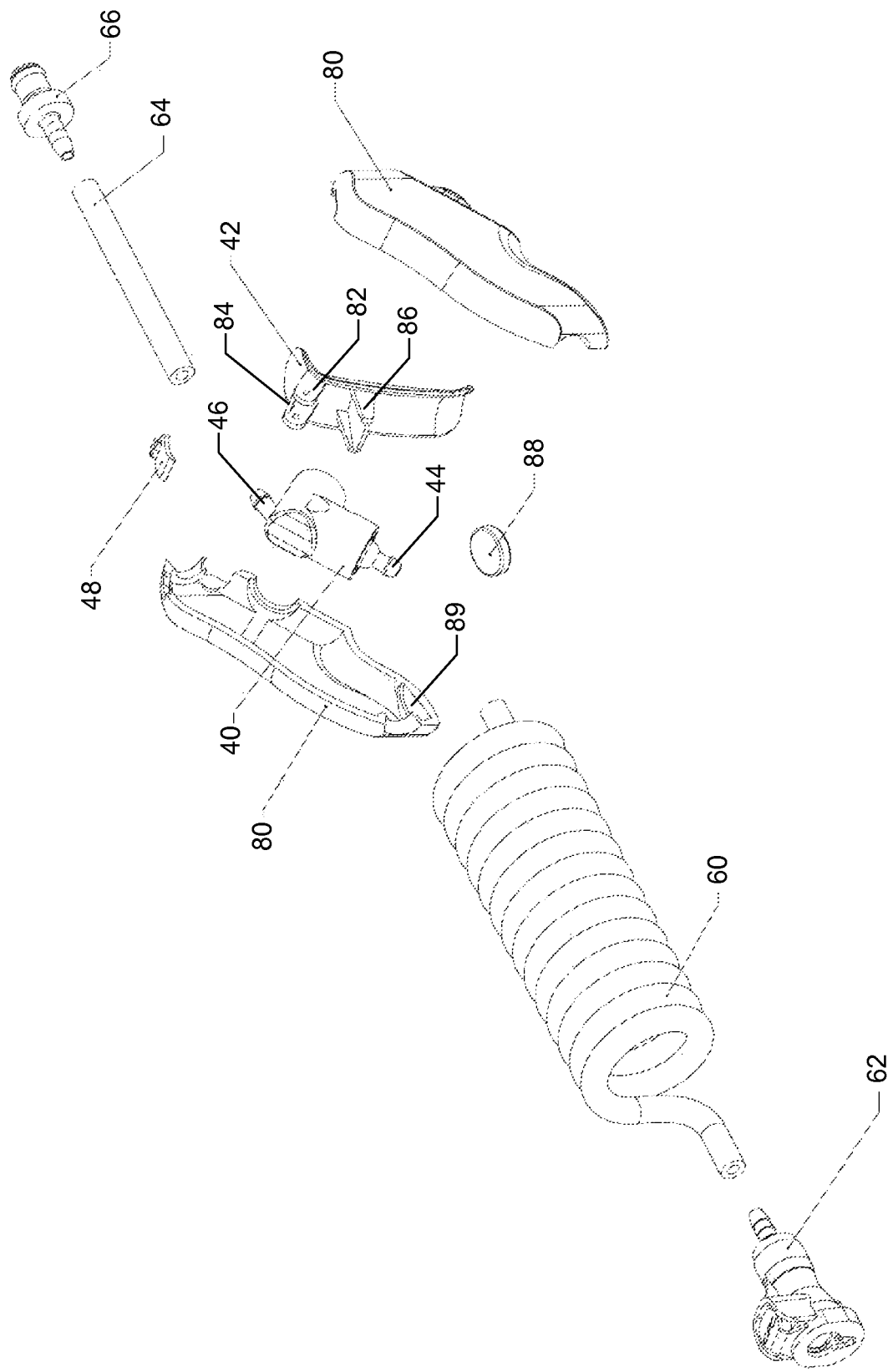
FIG. 11 shows a schematic exploded view of a trigger arrangement of FIG. 10.

The apparatus 10 also includes the delivery assembly 14, shown in more detail in FIGS. 7 and 8. In the shown example, the delivery assembly 14 includes a delivery conduit separated by an inlet connector 16 (FIG. 1) into a first conduit 20 and a second conduit 36. The conduit 36 is arranged in fluid communication with a mouth nozzle 18 via a first conduit 20, which therefore acts as a delivery tube. The delivery assembly 14 is typically configured for fitment to the animal's head, such as via attachment to a bridle 22, as shown, or the like. The nozzle 18 is configured for dispensing fluid into a mouth of the animal 12. As such, the nozzle 18 is generally fastenable to a bit 17 by means of attachment clips, such as 23. Alternatively, the delivery tube can be used with bitless horses by passing the tube through the mouth and attaching the tube on the side of the mouth, with a delivery nozzle or hole being provided in the horse's mouth. This may be used for example with hackamores. Another example would be the provision of an elbow join to allow the emission of liquid into the side of an animal's mouth.

In the case of the apparatus being used with the horse's existing bit, the mouth nozzle of the apparatus is completely unobtrusive to the horse being made of strong but soft material. The part which is present in the horse's mouth lies just in front of the horse's bit where there is a naturally occurring space of just the right size caused by the slight depression of the tongue by the weight of the bit. Thus the horse cannot feel that there is anything additional in the mouth. This allows completely normal communication with the rider. If the bit has a port then the mouth part of the apparatus will again not be felt by the horse as it will follow the shape of the bit arched over the horse's tongue.

The inlet connector 16 provides a degree of modularity to the delivery assembly 14, so that the nozzle 18 and first conduit 20 can be left on the animal 12 whilst the second conduit 36, the reservoir assembly 24, and the trigger arrangement 38 may be removed.

The delivery assembly 14 typically includes an extensible second conduit 36, which may for example be elastically coiled, which arranges the pump outlet 46 and the inlet connector 16 in fluid communication with each other. The coiled second conduit 36 allows the animal free and unimpeded movement of the head and neck. The elastically coiled second conduit 36 typically includes mane attachments 37 configured for attaching the second conduit 36 to a mane of the animal 12 (shown in FIG. 1). The mane attachment 37 may include any suitable clip or fastening means for temporarily fastening the second conduit 36 to the mane.

The delivery assembly 14 typically further includes a check valve to prevent the animal 12 from sucking fluid from the first or the second conduit 20 or 36. In one example, the inlet connector 16 includes such a check valve. Alternatively, the mouth nozzle 18 can include a check valve. It is to be appreciated that the check valve can also be included anywhere in either the first or second conduits 20 or 36, respectively. There may be more than one check valve and any of the check valves may be positioned anywhere on the apparatus.

In one example, the delivery assembly 14 includes attachment clips 21 and 23 for attaching the component parts thereof, i.e. the nozzle 18, first conduit 20, the inlet connector 16, etc. to a harness of the animal 12, as shown. The harness generally includes the bridle 22, reins 19, bit 17, and the like. However, the delivery assembly 14 may be configured for fitment to the animal without any harness, or may be configured for attachment in addition to a bridle.

In use, actuation of the pump 40 via the pump actuator 42 pumps fluid from the reservoir assembly 24 to the mouth nozzle 18 accompanied by a simultaneous emission of sound from the sound emitter 48. This feature is regarded as particularly important to the invention, as the simultaneous provision of a tastable reward and an audible response finds particular application in positive behaviour enforcement training in animals. The use of the sound precisely indicates to the horse the exact moment of the required behaviour.

It is also regarded as advantageous that the positioning of the trigger arrangement 38 allows freedom to a rider's hands when used in the mounted position.

In addition, the mouth nozzle 18 is fastenable to a wide variety of bits making the delivery assembly 14 easily adaptable to a wide variety and differently configured animal harnesses.

It is to be appreciated that the sound emitter 48 can be located anywhere on the animal and is not limited to inclusion in the trigger arrangement 38, as shown. For example, if an electronic and wireless sound emitter is used, as envisaged as an option above, the emitter 48 can be placed at any convenient location, e.g. on a harness of the animal proximate its head, worn by a rider or trainer, etc.

A second example apparatus will now be described with reference to FIGS. 9 to 14. In this example, similar reference numerals are used to denote similar features, and these aspects of the design will not therefore be described in detail.

In this example, the reservoir assembly 24 includes the reservoirs 30, for insertion into pouches similar to those described above with respect to FIG. 1. Each bladder 30 includes a bladder outlet 52 coupled to the connecting tube 32. The bladder outlets 52 are arranged at a lower end of the bladder 30 when the bladder is in use, thereby ensuring that substantially all fluid from the bladder can be extracted via the connecting tube 32, if required. A trigger support 54 is also provided, having a dock 56, for receiving the trigger arrangement 38, when this is not being used, or when the rider prefers to use it mounted on the dock.

The outlet 34 of the reservoir assembly 24 is coupled via a connector 62 to an inlet tube 60, which is in turn coupled to the inlet 44 of the pump 40. The pump outlet 46 is coupled via an outlet tube 64, and connectors 66, 68, to the second conduit 36. The second conduit 36 is in turn coupled to the delivery assembly 14, via connectors 70, 72. The rider may demount the trigger and hold it with the reins or any other way so that there is no disturbance to the normal style of the user's riding, therefore preventing interference in the usual communication between the horse and rider. The extensible conduit between the reservoir and the rider's hand allows the safe movement of the rider's hand so that the hand may be positioned near the saddle or further up the horse's neck when required.

The connectors allow the modularity of the apparatus so that it is not one entity which may cause difficulty or danger for example for the safe putting on and taking off of the components.

The trigger arrangement 38 is shown in more detail in FIGS. 11 to 14. As shown, the trigger arrangement 38 includes a housing 80, containing the fluid pump 40 and a sound emitter 48, as well as a pump actuator 42 pivotally mounted to the housing 80 to allow actuation of the pump 40 and sound emitter 48. To achieve this, the pump actuator 42 includes arms 82, for pivotally mounting the pump actuator 42 to the housing 80, as well as sound and pump actuator members 84, 86, for engaging the sound emitter 48 and pump 40 respectively.

The housing 80 is shaped to be held in use, allowing a user to squeeze the pump actuator 42 and thereby actuate the pump 40, as will be described in more detail below. In addition, the housing 80 typically includes a coupling mechanism for coupling the trigger arrangement to the dock 56, thereby allowing the trigger arrangement to be stored when not in use. This can be achieved using any suitable arrangement and in one example, utilises a magnet 88, mounted in a recess 89 of the housing 80, to allow the trigger assembly 80 to magnetically couple to a corresponding magnet provided in the dock 56.

The fluid pump 40 includes a pump housing 90 defining a pump cavity 91 containing a spring 92 and a plunger 93. A bearing 94 is provided in an inlet cavity 95 adjacent the inlet 44. In use, the spring 92 biases the plunger 93 out of the pump cavity 91, thereby drawing fluid into the pump cavity 91, via the inlet 44. When the user squeezes the pump actuator 42, the pump actuator 42 pivots about the arms 82, causing the pump actuator member 86 to engage the plunger 93, which is then urged into the pump cavity 91, thereby displacing the fluid therein. The bearing 94 seals against the inlet 44, thereby causing fluid to be expelled via the outlet 46, as will be appreciated by persons skilled in the art. As this occurs, and the pump actuator 42 pivots, the sound actuator member 84 engages the sound emitter 48, thereby causing a sound to be emitted simultaneously with fluid being dispensed.

Figure 15:
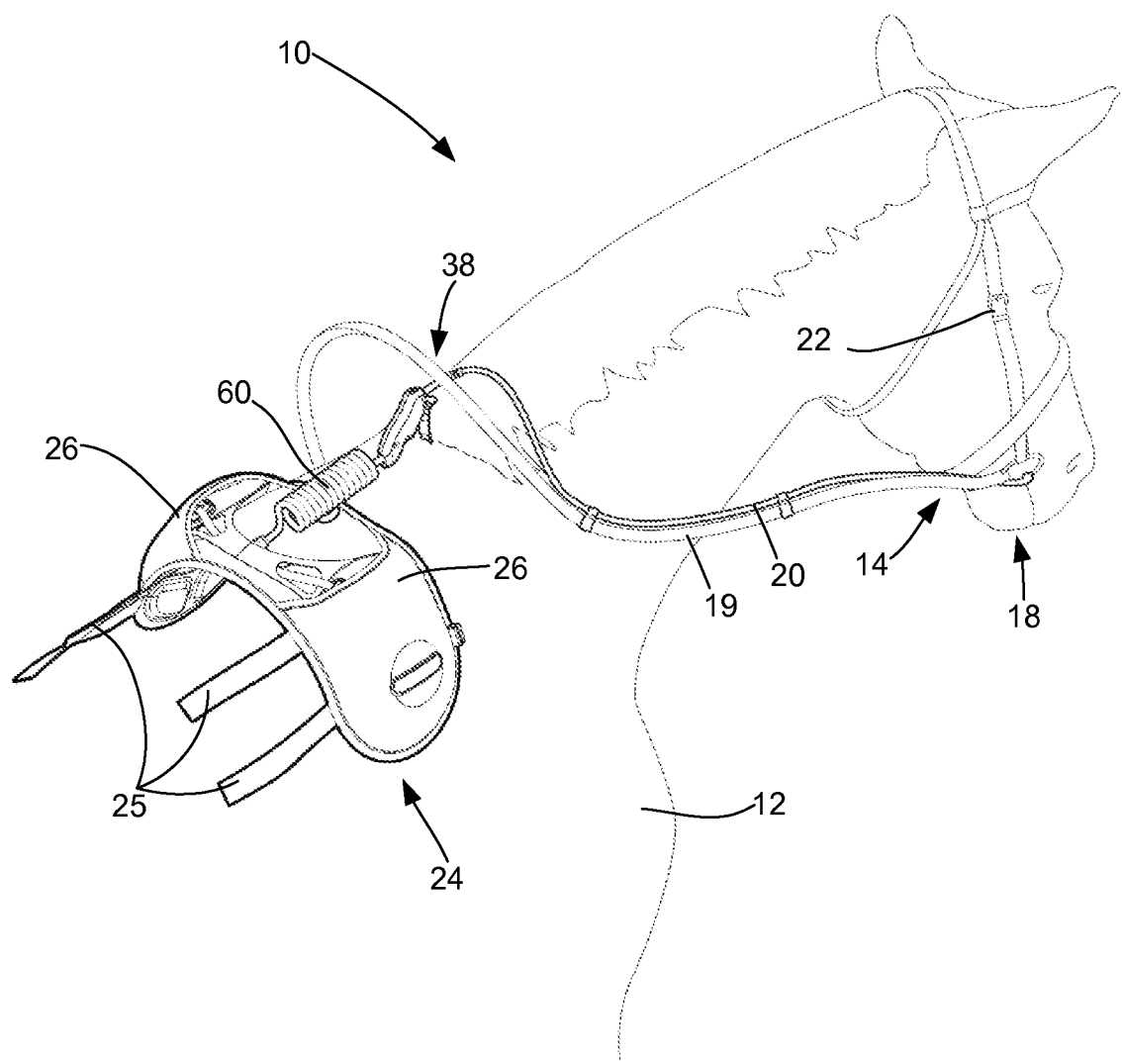
FIG. 15 shows a schematic perspective view of a third example of animal training apparatus fitted to a horse.
Figure 16:
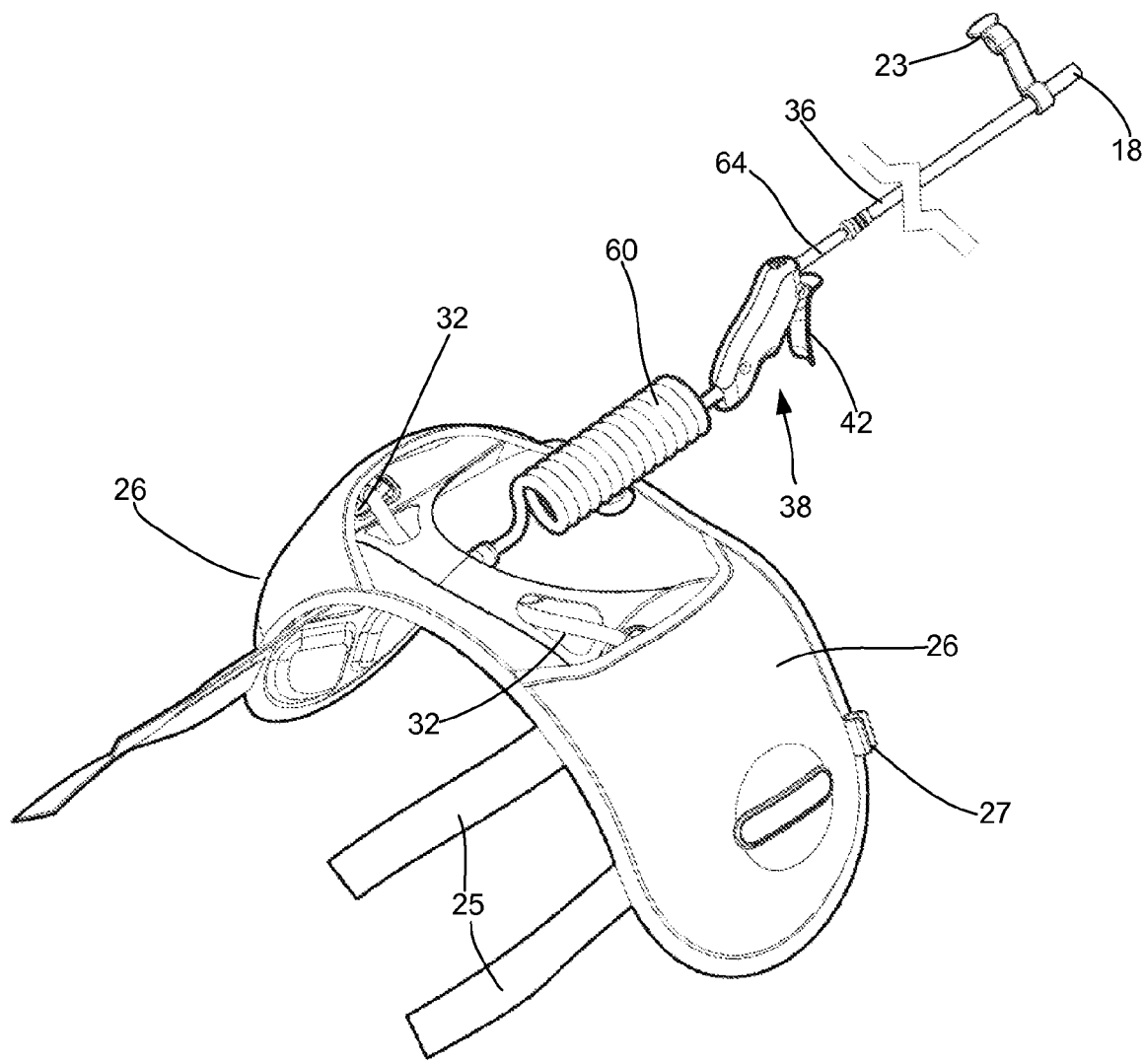
FIG. 16 shows a schematic perspective view of the animal training apparatus of FIG. 15; and, FIG. 17 shows a schematic exploded view of the animal training apparatus of FIG. 15.
Figure 17:
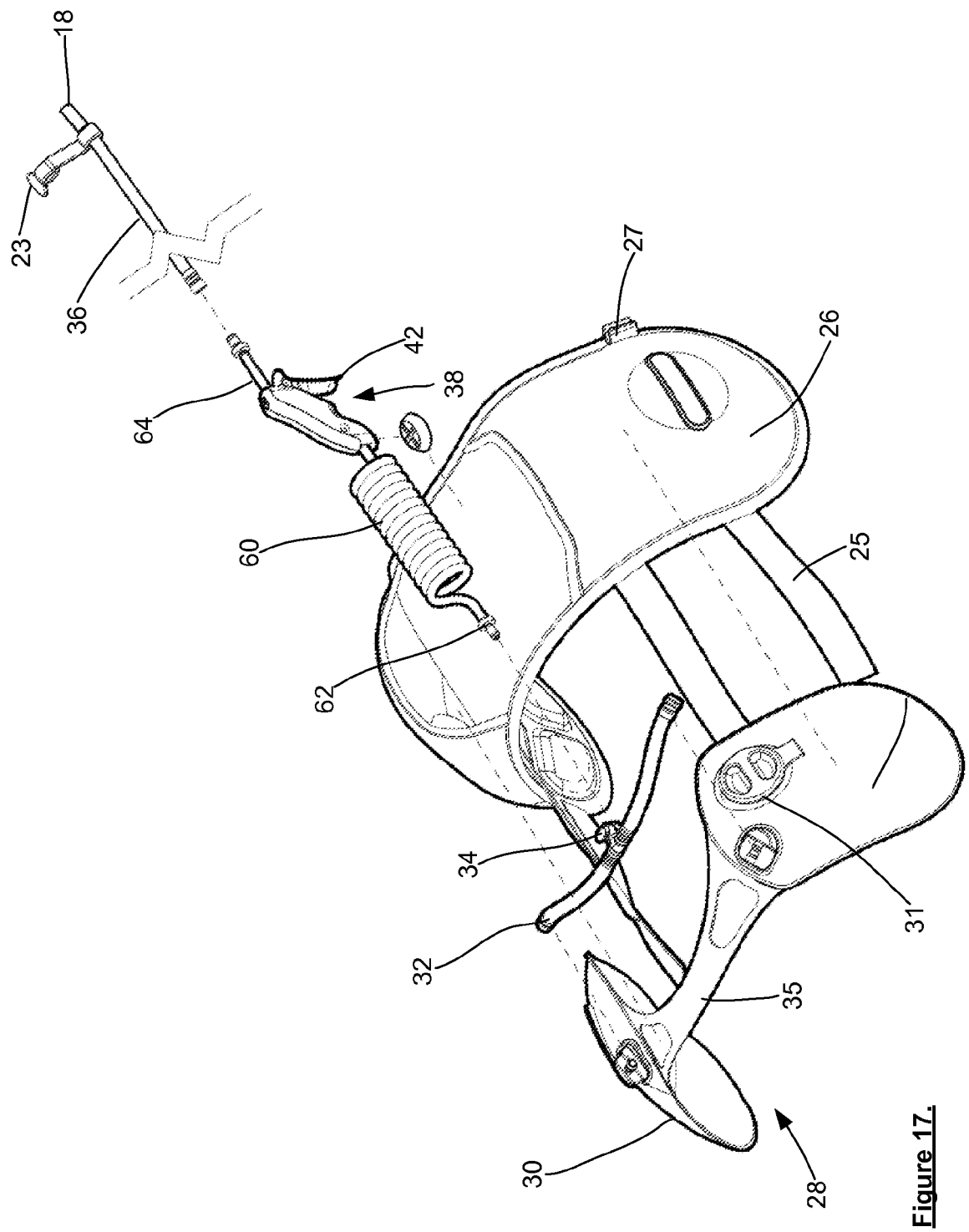

In the example of FIGS. 9 to 14, the second conduit 36 again runs along the neck of the animal, as in the examples of FIGS. 1 to 8. However, in a further example, shown in FIGS. 15 to 17, in which the first conduit 20 extend along the reins 19, as shown. It will be appreciated that this reduces the impact of mounting the apparatus on the horse, and in particular allows the apparatus to be primarily connected to existing equipment used with the horse, minimising the need for additional connections, which can disrupt the horse. Additionally, by having the conduit extend along the reins, this allows the user to easily hold the trigger arrangement in their hand, whilst still grasping the reins, thereby reducing any interference to the rider's normal riding position.

Accordingly, it will be appreciated that the above described examples can deliver a liquid reward to an animal accompanied by a sound for the purposes of ethical animal training using positive reinforcement. A trainer may use the above described apparatus while mounted or dismounted. The benefits of the apparatus may be used for positive reinforcement training on its own or the enhancement of any other type of training provided that training does not stress or adrenalise the animal. The apparatus may also combine the training features of the reward liquid and the sound with the administration of liquid to re-hydrate, refresh, cool down, medicate and nourish the animal.

Positive reinforcement relies on the instant reward which causes an action to be associated with that reward. The effectiveness of the training is dependent on the timing of the instant reward. Responses trained correctly with are quickly and strongly associated. The use of sound allows the animal to acknowledge the correct behaviour quicker than is possible using only taste. The clarity and precision which can be achieved with this apparatus using the sound association with the reward enhances communication and improves learning. This apparatus, therefore, allows for extremely precise shaping of behaviour, for example the degree of arching of a horse's neck or the positioning of an ear.

Additionally, as the sound is generated when the trigger is activated, this will occur shortly before the liquid is delivered to the horse. This therefore alerts the horse to the liquid award being delivered, allowing the horse to anticipate the delivery of the liquid, and avoid the uncertainty that can arise in the event that liquid is delivered without the use of the associated sound. This negates the risk of breaking the horse's concentration or startling the horse.

The horse quickly learns that the sound is associated with a positive reward, and this therefore does not require the horse to identify the taste of the liquid when the sound is heard, thereby avoiding the horse being distracted in assessing whether there is a pleasant or unpleasant taste, which in turn helps maintain rider safety.

Additionally the use of the sound helps riders to develop training expertise by clearly identifying the behaviour they wish to train. Riders learn to plan each training exercise and to identify the required outcome in order to decide when to reward the horse. Novice riders up to Olympic level riders will find that this feature will enhance their understanding of how horses learn which will be of great benefit to both the horse and rider and their performance.

In addition, the administration of a pleasant tasting liquid improves motivation and calmness, thereby increasing rider and handler safety. Thus the apparatus will be of immense benefit to all riders whether skilled in training or not. For example if a novice rider were to initiate a pleasant liquid to the horse but the horse did not understand any association with previous behaviour the horse is more motivated and in a state of awareness of the rider which will help the rider to guide the horse. Putting the horse in a "listening state" is one of the major benefits of this apparatus and enhances communication and training significantly.

It will be appreciated that the sweet liquid will be a pleasant taste to the horse and the horse can be trained to recognise that the liquid delivered by the apparatus will be pleasing to taste. Different tastes may be offered to the horse to see which ones are preferable to that individual. When introducing the horse to the apparatus for the first time the horse will be given the opportunity to experience the pleasant taste before training begins.

Accordingly, the above described apparatus provides a mechanism for training animals, for example horses, using positive reinforcement providing both primary and secondary reinforcers. The primary reinforcer may be a sweet liquid which the trainer can send to the horse's mouth to reward the horse, at the same time causing a sound to be emitted being the secondary reinforcer, thereby instantly marking the exact moment of the desired behaviour facilitating association in the horse's mind. In particular, the horse's brain takes in a sound much faster than it can acknowledge a taste in the mouth, so the simultaneous application of sound provides instantaneous feedback to the horse.

The apparatus therefore allows an animal to be rewarded by a trainer, either during riding or otherwise, whilst alerting the horse of the precise instant of behaviour to be learnt and also warning the horse to expect a liquid in the mouth preventing distraction to the horse. The apparatus can therefore provide a precision tool for the effective training of horses using positive reinforcement through primary and secondary reinforcers. The apparatus allows fitting to all sizes of animals, to all styles of existing harness, for all stages of training, for all degrees of expertise of trainers, for all styles of riding, and for all disciplines.

This above described apparatus therefore seeks to improve animal welfare, animal and human safety, and reduce wastage by providing an effective tool for communication using positive reinforcement.

Whilst the above examples have focussed on positive reinforcement, this is not essential, and the device can be used in conjunction with negative reinforcement techniques, or any other training provided the horse is calm and not stressed or adrenalised.

Persons skilled in the art will appreciate that numerous variations and modifications will become apparent. All such variations and modifications which become apparent to persons skilled in the art should be considered to fall within the spirit and scope of the invention broadly appearing and described in more detail herein.

It is to be appreciated that reference to "one example" or "an example" of the invention is not made in an exclusive sense. Accordingly, one example may exemplify certain aspects of the invention, whilst other aspects are exemplified in a different example. These examples are intended to assist the skilled person in performing the invention and are not intended to limit the overall scope of the invention in any way unless the context clearly indicates otherwise.

Features that are common to the art are not explained in any detail as they are deemed to be easily understood by the skilled person. Similarly, throughout this specification, the term "comprising" and its grammatical equivalents shall be taken to have an inclusive meaning, unless the context of use clearly indicates otherwise.

The claims defining the invention are as follows:
1. An animal training apparatus comprising:
   a) a delivery assembly having a delivery conduit arranged in fluid communication with a mouth nozzle, the nozzle configured for dispensing fluid into a mouth of an animal;
   b) a reservoir assembly for fitment over a back of an animal, the reservoir assembly including:
      i) a reservoir for storing fluid; and,
      ii) a dock;
   c) a trigger arrangement including:
      i) a fluid pump having a pump actuator, the pump having an outlet arranged in fluid communication with the delivery conduit and an inlet arranged in fluid communication with the reservoir;
      ii) a sound emitter configured to be actuated by the pump actuator, wherein actuation of the pump pumps fluid from the reservoir to the mouth nozzle accompanied by a simultaneous emission of sound from the sound emitter; and
      iii) a housing containing the fluid pump and sound emitter, the housing including a coupling mechanism for coupling the trigger arrangement to the dock.

2. The animal training apparatus of claim 1, wherein the pump actuator is pivotally mounted to the housing to allow actuation of the pump and sound emitter.

3. The animal training apparatus of claim 2, wherein the pump actuator includes first and second engaging portions arranged so that pivotal movement of the pump actuator causes the first and second engaging portions to engage and activate the pump and the sound emitter respectively.

4. The animal training apparatus of claim 2, wherein the housing is shaped to be held in use.

5. The animal training apparatus of claim 1, wherein the housing includes a magnet for magnetically coupling the housing to the dock.

6. The animal training apparatus of claim 1, wherein the inlet is coupled to an inlet tube for coupling the fluid pump to the reservoir assembly.

7. The animal training apparatus of claim 6, wherein the inlet tube includes a connector for connecting the inlet tube to a connecting tube of the reservoir assembly.

8. The animal training apparatus of claim 1, wherein the trigger arrangement includes a mount for mounting the trigger arrangement to a harness of an animal.

9. The animal training apparatus of claim 1, wherein the sound emitter includes a clicker.

10. The animal training apparatus of claim 1, wherein a volume of sound produced by the sound emitter is adjustable.

11. The animal training apparatus of claim 1, wherein the pump actuator is cantilevered to the fluid pump to define a low profile and to facilitate actuation of the pump.

12. The animal training apparatus of claim 1, wherein the pump actuator is configured to wirelessly actuate the pump and the sound emitter.

13. The animal training apparatus of claim 1, wherein the sound emitter can emit different sounds.

14. The animal training apparatus of claim 13 wherein the sound emitter includes a control for emitting a sound without the issue of the reward.

15. The animal training apparatus of claim 13, wherein the sound emitter includes a control for allowing a user to select different sounds.

16. The animal training apparatus of claim 1, wherein the delivery assembly includes a delivery tube extending from a delivery tube connector to the mouth nozzle, the delivery tube connector being for coupling to the outlet of the trigger arrangement.

17. The animal training apparatus of claim 16, wherein the delivery assembly includes at least one clip for mounting the delivery tube to a bridle of a horse.

18. The animal training apparatus of claim 16, wherein the delivery tube is adapted to extend along reins to a bridle of a horse.

19. The animal training apparatus of claim 16, wherein the delivery assembly includes an inlet connector separating the delivery tube into detachable first and second conduits.

20. The animal training apparatus of claim 19, wherein the second conduit includes an extensible conduit arranging the pump outlet and the inlet connector in fluid communication.

21. The animal training apparatus of claim 20, wherein the extensible second conduit includes a mane attachment configured for attaching the second conduit to a mane of the animal.

22. The animal training apparatus of claim 1, wherein the delivery assembly includes a check valve to prevent the animal from sucking fluid from the delivery nozzle.

23. The animal training apparatus of claim 1, wherein the reservoir assembly includes:

a. at least two opposed supports configured for fitment over a back of an animal so that a support rests on either side of the animal;
b. the reservoir having at least two components that are each receivable on one of the opposed supports; and
c. a reservoir outlet arranged in fluid communication with the reservoir, said reservoir outlet configured for attachment to the trigger arrangement.

24. The animal training apparatus of claim 1, wherein the mouth nozzle includes a clip for attaching said nozzle to a bit.

25. A training apparatus used in training a horse, which comprises:
  a) a delivery assembly having a delivery conduit arranged in fluid communication with a mouth nozzle;
  b) a reservoir assembly that fits over a back of the horse, the reservoir assembly including:
    i) at least two opposed supports configured for fitment over a back of the horse so that one of the opposed supports rests on either side of the horse;
    ii) a reservoir for storing fluid, the reservoir having at least two components that are each receivable on one of the opposed supports;
    iii) a single reservoir outlet arranged in fluid communication with each said component of the reservoir, said single reservoir outlet configured for attachment to a trigger arrangement; and,
    iv) a dock;
  c) the trigger arrangement including:
    i) a fluid pump with a pump actuator, the fluid pump having an outlet arranged in fluid communication with the delivery conduit and an inlet arranged in fluid communication with the reservoir; and
    ii) a sound emitter configured to be actuated by the pump actuator, wherein actuation of the pump pumps fluid from the reservoir to the mouth nozzle, so that the mouth nozzle dispenses fluid into a mouth of the horse accompanied by a simultaneous emission of sound from the sound emitter; and
    iii) a housing containing the fluid pump and sound emitter, the housing including a coupling mechanism for coupling the trigger arrangement to the dock.

\* \* \* \* \*